United States Patent
Kim et al.

(10) Patent No.: US 12,156,143 B2
(45) Date of Patent: Nov. 26, 2024

(54) METHOD AND APPARATUS FOR SIMULTANEOUS TRANSMISSION AND RECEPTION OPERATION IN COMMUNICATION SYSTEM

(71) Applicant: ELECTRONICS AND TELECOMMUNICATIONS RESEARCH INSTITUTE, Daejeon (KR)

(72) Inventors: Jun Hyeong Kim, Daejeon (KR); Seon Ae Kim, Daejeon (KR); Il Gyu Kim, Daejeon (KR); Go San Noh, Daejeon (KR); Hee Sang Chung, Daejeon (KR); Dae Soon Cho, Daejeon (KR); Sung Woo Choi, Daejeon (KR); Seung Nam Choi, Daejeon (KR); Jung Pil Choi, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 399 days.

(21) Appl. No.: 17/507,810

(22) Filed: Oct. 22, 2021

(65) Prior Publication Data

US 2022/0132432 A1    Apr. 28, 2022

(30) Foreign Application Priority Data

Oct. 23, 2020 (KR) .................. 10-2020-0137998
Oct. 8, 2021 (KR) .................. 10-2021-0134236

(51) Int. Cl.
*H04W 52/14*    (2009.01)
*H04L 5/00*    (2006.01)
*H04W 52/36*    (2009.01)
*H04W 72/0446*    (2023.01)

(52) U.S. Cl.
CPC ......... *H04W 52/146* (2013.01); *H04L 5/0048* (2013.01); *H04W 52/365* (2013.01); *H04W 52/367* (2013.01); *H04W 72/0446* (2013.01)

(58) Field of Classification Search
CPC .................................................. H04W 52/146
See application file for complete search history.

(56) References Cited

U.S. PATENT DOCUMENTS 9,276,314 B2    3/2016    Bang et al.
10,440,688 B2    10/2019    Ramakrishna et al.
(Continued)

FOREIGN PATENT DOCUMENTS

EP    2898733 B1    11/2017
KR    1020170085436 A    7/2017
(Continued)

OTHER PUBLICATIONS

3GPP TR 38.874 V16.0.0 (Dec. 2018), "3rd Generation Partnership Project; Technical Specification Group Radio Access Network; NR; Study on Integrated Access and Backhaul; (Release 16)".
(Continued)

*Primary Examiner* — Hsinchun Liao
(74) *Attorney, Agent, or Firm* — Rabin & Berdo, P.C.

(57) ABSTRACT

An operation method of an IAB node in a communication system may comprise: measuring a power difference between a first signal received from a first node and a second signal received from a second node; controlling a transmit power of each of the first node and the second node based on the power difference; generating scheduling information for allowing the first node and the second node to simultaneously transmit signals; transmitting the scheduling information to the first node and the second node; and receiving
(Continued)

signals that the first node and the second node simultaneously transmit according to the scheduling information by using the transmit power.

5 Claims, 25 Drawing Sheets

(56) References Cited

U.S. PATENT DOCUMENTS

| | | |
|---|---|---|
| 10,623,067 B2 | 4/2020 | Wang et al. |
| 2010/0202388 A1 | 8/2010 | Madan et al. |
| 2019/0150213 A1 | 5/2019 | Kim |
| 2019/0349162 A1 | 11/2019 | Qi et al. |
| 2020/0107362 A1 | 4/2020 | Qi et al. |
| 2020/0275499 A1 | 8/2020 | Novlan et al. |
| 2020/0322976 A1 | 10/2020 | Islam et al. |
| 2020/0337000 A1 | 10/2020 | Kim |

FOREIGN PATENT DOCUMENTS

| | | |
|---|---|---|
| KR | 1020190045713 A | 5/2019 |
| KR | 1020190089510 A | 7/2019 |
| KR | 1020200058576 A | 5/2020 |

OTHER PUBLICATIONS

Samsung, "Other enhancements to Timing, Power Control and CLI for NR IAB", R1-2006166, 3GPP TSG RAN WG1 #102-e e-Meeting, Aug. 17-28, 2020.

METHOD AND APPARATUS FOR SIMULTANEOUS TRANSMISSION AND RECEPTION OPERATION IN COMMUNICATION SYSTEM

CROSS-REFERENCE TO RELATED APPLICATIONS

This application claims priority to Korean Patent Applications No. 10-2020-0137998, filed on Oct. 23, 2020, and No. 10-2021-0134236 filed on Oct. 8, 2021 with the Korean Intellectual Property Office (KIPO), the entire contents of which are hereby incorporated by reference.

BACKGROUND

1. Technical Field

The present disclosure relates to a technique for operating simultaneous transmission and reception, and more particularly, to a technique for operating simultaneous transmission and reception in a communication system, which enables an integrated access and backhaul (IAB) node to simultaneously perform transmission and reception of data in a non-time division multiplexing (TDM) scheme in an IAB environment.

2. Related Art

With the development of information and communication technology, various wireless communication technologies have been developed. Typical wireless communication technologies include long term evolution (LTE) and new radio (NR), which are defined in the 3rd generation partnership project (3GPP) standards. The LTE may be one of 4th generation (4G) wireless communication technologies, and the NR may be one of 5th generation (5G) wireless communication technologies.

In order to process wireless data increasing rapidly after commercialization of the fourth generation (4G) communication system (e.g., long term evolution (LTE) communication system or LTE-Advanced (LTE-A) communication system), a fifth generation (5G) communication system (e.g., new radio (NR) communication system) using not only a frequency band (e.g., frequency band of 6 GHz or below) of the 4G communication system but also a frequency band (e.g., frequency band of 6 GHz or above) higher than the frequency band of the 4G communication system is being considered. The 5G communication system may support enhanced Mobile BroadBand (eMBB), Ultra-Reliable and Low Latency Communication (URLLC), and massive Machine Type Communication (mMTC).

In order to satisfy the ever-increasing user requirements for mobile communication, such the 5G communication system has adopted a mobile communication scheme using the high frequency band such as a millimeter wave band that can utilize a wide bandwidth, in addition to the low-frequency band of 6 GHz or below supported by the existing 4G communication system. The newly introduced millimeter wave may have a smaller cell coverage due to its propagation characteristics having strong straightness, which may lead to a closer arrangement between cells causing a significant increase in the construction costs of using optical cables. On the other hand, according to an integrated access and backhaul (IAB) technology, IAB nodes which are flexible for 5G cells capable of using a wide bandwidth and support wireless backhaul links and access links in an integrated manner may be formed to enable dense deployment. In such the IAB environment, interference may occur when an IAB node perform data transmission and reception simultaneously with a parent node and a child node in a non-time division multiplexing (TDM) scheme rather than a TDM scheme. In order to solve this problem, a non-TDM-based resource multiplexing scheme applicable to a process in which the IAB node performs signal transmission and reception with the parent node and the child node, and detailed techniques therefor may be required.

SUMMARY

Accordingly, exemplary embodiments of the present disclosure are directed to providing methods and apparatuses for operating simultaneous transmission and reception in a communication system, which provide a resource multiplexing scheme and detail techniques therefor, so that an IAB node simultaneously performs data transmission and reception with a parent node and a child node in a non-TDM scheme.

According to a first exemplary embodiment of the present disclosure, an operation method of an IAB node in a communication system may comprise: measuring a power difference between a first signal received from a first node and a second signal received from a second node; controlling a transmit power of each of the first node and the second node based on the power difference; generating scheduling information for allowing the first node and the second node to simultaneously transmit signals; transmitting the scheduling information to the first node and the second node; and receiving signals that the first node and the second node simultaneously transmit according to the scheduling information by using the transmit power.

The controlling of the transmit power may comprise: determining whether the power difference exceeds a first threshold; in response to determining that the power difference exceeds the first threshold, identifying first headroom information of the first node and second headroom information of the second node; determining the transmit power of the first node based on the first headroom information and determining the transmit power of the second node based on the second headroom information; and transmitting information on the determined transmit powers to the first node and the second node.

The controlling of the transmit power may comprise: determining whether the power difference exceeds a second threshold; and in response to determining that the power difference exceeds the second threshold, switching a transmission scheme of the first node and a transmission scheme of the second node from a non-time division multiplexing (TDM) scheme to a TDM scheme.

The controlling of the transmit power may comprise: determining whether the power difference exceeds a first threshold; in response to determining that the power difference exceeds the first threshold, transmitting, to the first node, a request signal indicating a first power adjustment range and indicating an adjustment to a transmit power within the first power adjustment range; and receiving a response signal including information indicating that the transmit power of the first node is adjusted to a transmit power within the first power adjustment range.

The controlling of the transmit power may comprise: determining whether the power difference exceeds a first threshold; in response to determining that the power difference exceeds the first threshold, transmitting, to the first node, a request signal of a second power adjustment range;

receiving, from the first node, a response signal including the second power adjustment range; identifying the second power adjustment range in the response signal; and selecting a transmit power within the second power adjustment range, and transmitting a request signal indicating an adjustment to the selected transmit power to the first node.

According to a second exemplary embodiment of the present disclosure, an operation method of an IAB node in a communication system may comprise: determining a downlink minimum power of a downlink signal transmitted to a child node; calculating an available uplink power based on the downlink minimum power; informing a parent node of the available uplink power; receiving, from the parent node, information on a transmit power selected within the available uplink power; and transmitting an uplink signal to the parent node by using the transmit power selected by the parent node.

The determining of the downlink minimum power may comprise: receiving a sounding reference signal from the child node; and determining the downlink minimum power based on a received signal strength of the sounding reference signal.

The determining of the downlink minimum power may comprise: transmitting a downlink reference signal to the child node; receiving information on a received signal strength of the downlink reference signal from the child node; and determining the downlink minimum power based on the received signal strength of the downlink reference signal.

In the calculating of the available uplink power, the available uplink power may be calculated by subtracting the downlink minimum power from a maximum uplink power that is a maximum power available for uplink transmission.

According to a third exemplary embodiment of the present disclosure, an operation method of an IAB node in a communication system may comprise: determining a first time based on a round trip delay time of the first node; based on the first time, calculating a second time for aligning starting times of symbols of a first uplink signal transmitted to the first node with starting times of symbols of a second uplink signal received from a second node in a time domain; transmitting information on the calculated second time to the second node; and receiving the second uplink signal from the second node at a timing obtained by adding the second time to a timing at which the first node receives the first uplink signal, wherein the second time is calculated by subtracting a remainder value obtained by dividing the first time by a symbol length from the symbol length, and the second uplink signal is transmitted based on the second time.

The operation method may further comprise: transmitting the first uplink signal to the first node at a timing obtained by subtracting the first time from the timing at which the first node receives the first uplink signal, wherein a starting time of at least one symbol among symbols in which the first uplink signal is transmitted is aligned with a reception timing of the second uplink signal.

The operation method may further comprise: identifying first positions of first reference signals included in the first uplink signal and second positions of second reference signals included in the second uplink signal; calculating a first offset of the second reference signals based on the first positions and the second positions; transmitting information on the calculated first offset to the second node; and receiving, from the second node, a third uplink signal including third reference signals arranged according to the first offset, wherein parts of the first positions and parts of third positions of the third reference signals arranged according to the first offset are aligned in a time domain.

The calculating of the first offset may comprise: determining counted values by counting a number of symbols disposed between a symbol starting time of each of the first reference signals and a symbol starting time of the second reference signal nearest to the each of the first reference signals; and determining, as the first offset, a counted value, wherein a counted value among the counted values that allows the largest number of overlapping reference signal symbols between the first reference signals and the second reference signals.

The information on the calculated second time may be transmitted through downlink control information (DCI) or a medium access control (MAC) control element (CE).

The operation method may further comprise: receiving a first downlink signal from the first node; determining a second offset by which a position of a first-positioned reference signal among fourth reference signals included in the first downlink signal moves closer to a position of a first-positioned reference signal among the second reference signals include the second uplink signal; transmitting information of the second offset to the first node; receiving a second downlink signal including the fourth reference signals arranged according to the second offset from the first node; identifying fourth positions of the fourth reference signals included in the second downlink signal and the second positions of the second reference signals included in the second uplink signal; calculating a third offset of the second reference signals included in the second uplink signal based on the second positions and the fourth positions; transmitting information on the calculated third offset to the second node; and receiving a fourth uplink signal including fifth reference signals arranged according to the third offset from the second node, wherein parts of the fourth positions of the fourth reference signals and parts of fifth positions of the fifth reference signals are aligned in a time domain.

In the present disclosure, the IAB node may perform power control so that a difference between receive powers of signals received from communication nodes (e.g., parent node, child node, and/or terminal) is within a predetermined range, thereby preventing a power imbalance between the received signals. In addition, the IAB node may perform power control so that a difference between transmit powers of signals transmitted by a parent child node and a terminal is within a predetermined range, thereby preventing a power imbalance between the transmitted signals. In addition, the IAB node may align an uplink (UL) reception timing of the IAB node with a UL transmission timing thereof by allowing one or more connected child nodes to transmit uplink signals based on a timing advance (TA). Further, the IAB node may facilitate detection of reference signals by allowing reception timings of reference signals of a UL signal transmitted to a parent node and a UL signal received from a child node to be aligned in the time domain.

DETAILED DESCRIPTION OF THE EMBODIMENTS

Figure 1:
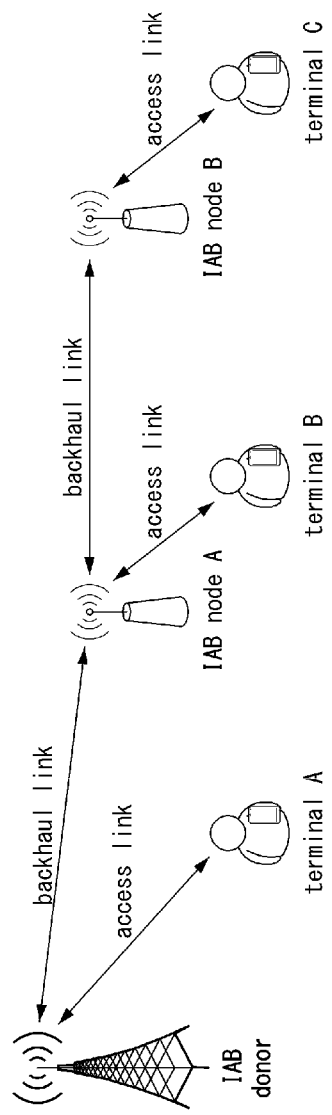
FIG. 1 is a conceptual diagram illustrating a first exemplary embodiment of an IAB network structure.

Embodiments of the present disclosure are disclosed herein. However, specific structural and functional details disclosed herein are merely representative for purposes of describing embodiments of the present disclosure. Thus, embodiments of the present disclosure may be embodied in many alternate forms and should not be construed as limited to embodiments of the present disclosure set forth herein.

Accordingly, while the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Throughout the present disclosure, a 'network' may include, for example, a wireless Internet such as Wi-Fi, a portable Internet such as wireless broadband internet (WiBro) or world interoperability for microwave access (WiMax), a $3^{rd}$ generation (3G) mobile communication network such as global system for mobile communication (GSM), code division multiple access (CDMA), or CDMA2000, a $3.5^{th}$ generation (3.5G) mobile communication network such as high speed downlink packet access (HSDPA) or high speed uplink packet access (HSUPA), a $4^{th}$ generation (4G) mobile communication network such as long term evolution (LTE) or LTE-Advanced, a $5^{th}$ generation (5G) mobile communication network, and/or the like.

Throughout the present disclosure, a 'terminal' may refer to a mobile station, mobile terminal, subscriber station, portable subscriber station, user equipment, access terminal, and/or the like, and may include all or some functions of the terminal, mobile station, mobile terminal, subscriber station, portable subscriber station, user equipment, access terminal, and/or the like.

The terminal may refer to a desktop computer, laptop computer, tablet PC, wireless phone, mobile phone, smart phone, smart watch, smart glass, e-book reader, portable multimedia player (PMP), portable game console, navigation device, digital camera, digital multimedia broadcasting (DMB) player, digital audio recorder, digital audio player, digital picture recorder, digital picture player, digital video player, or the like that has communication capability and that a mobile communication service user can use.

Throughout the present disclosure, a 'base station' may refer to an access point, radio access station, NodeB, evolved NodeB, base transceiver station, mobile multi-hop relay-base station (MMR-BS), and/or the like, and may include all or some functions of the base station, access point, wireless access station, NodeB, evolved NodeB, base transceiver station, MMR-BS, and/or the like.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, a 3GPP NR system as well as a 3GPP LTE/LTE-A system may be described as an example of a radio access system in which exemplary embodiments of the present disclosure are applicable. Hereinafter, in order to clarify the description of the present disclosure, the description is based on the 3GPP communication system (LTE, NR, etc.), but the technical spirit of the present disclosure is not limited thereto.

The following techniques may be used for various radio access communication systems such as code division multiple access (CDMA), frequency division multiple access (FDMA), time division multiple access (TDMA), orthogonal frequency division multiple access (OFDMA), and single carrier frequency division multiple access (SC-FDMA).

Hereinafter, exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted.

FIG. 1 is a conceptual diagram illustrating a first exemplary embodiment of an IAB network structure.

Referring to FIG. 1, an IAB network 100 of a mobile communication system may include an IAB donor and/or at least one IAB node. The IAB donor may communicate with at least one IAB node via backhaul link(s). In addition, the IAB donor may communicate with at least one terminal via access link(s). The IAB node may be connected to the at least one IAB node via backhaul link(s). The aforementioned IAB node may relay communication between the IAB donor and other IAB nodes. The IAB node may be connected to at least one terminal via access link(s). The aforementioned IAB node may relay communication between the IAB donor and the terminal. The aforementioned IAB node may relay communication between the IAB donor and other IAB nodes and/or terminals. For example, the IAB donor may communicate with an IAB node A via a backhaul link, and the IAB donor may communicate with a terminal A via an access link.

In an exemplary embodiment, the IAB node A may be connected to the IAB donor via a backhaul link, and the IAB node A may be connected to a terminal B via an access link. The IAB node A may relay communication between the IAB donor and the terminal B. The IAB donor may communicate with the terminal B through the relaying of the IAB node A.

In another exemplary embodiment, the IAB Node B may be connected to the IAB donor via a backhaul link, and the IAB node B may be connected to a terminal C via an access link.

The present disclosure is not limited to the above-described IAB network structure, and the present disclosure may be applied to various IAB network topologies to which a technology for relaying communication between at least one IAB donor, at least one IAB node, and/or at least one terminal in a mobile communication system can be applied. The IAB donor may be connected to the IAB node via a backhaul link, and may make relay connections with the terminals. A multi-hop connection for communication via at least one node may be possible between IAB nodes.

Figure 2:
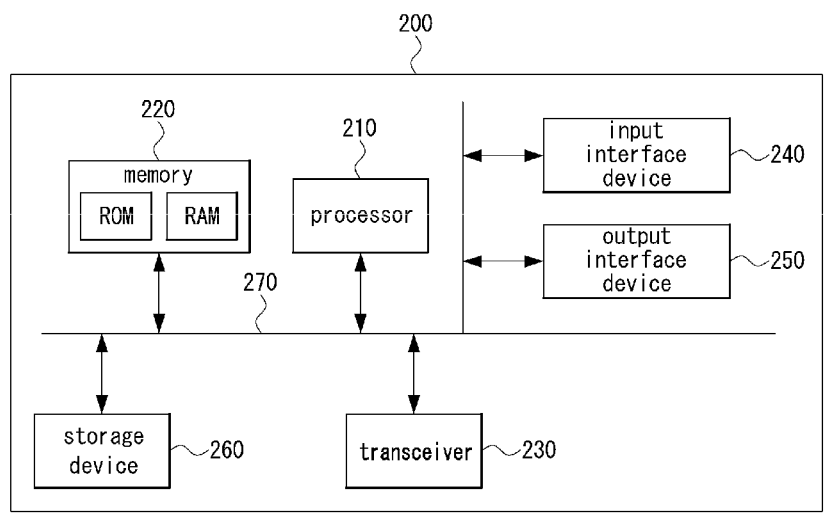
FIG. 2 is a block diagram illustrating a first exemplary embodiment of an IAB node included in an IAB network.

FIG. 2 is a block diagram illustrating a first exemplary embodiment of an IAB node included in an IAB network.

Referring to FIG. 2, an IAB node 200 in a mobile communication system may comprise at least one processor 210, a memory 220, and a transceiver 230 connected to the network for performing communications. The processor may receive information on a plurality of divided time resources through the transceiver in order to transmit/receive a signal, transmit a signal by using one of the plurality of divided time resources through the transceiver, and the one time resource may be determined based on an IAB node list. The transceiver 230 may be referred to as a transmission and/or reception module, radio frequency (RF) unit, RF module, or the like. Also, the IAB node 200 may further comprise an input interface device 240, an output interface device 250, a storage device 260, and the like. Each component included in the communication node 200 may communicate with each other as connected through a bus 270.

However, each component included in the IAB node 200 may not be connected to the common bus 270 but may be connected to the processor 210 via an individual interface or a separate bus. For example, the processor 210 may be connected to at least one of the memory 220, the transceiver 230, the input interface device 240, the output interface device 250 and the storage device 260 via a dedicated interface.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Figure 3:
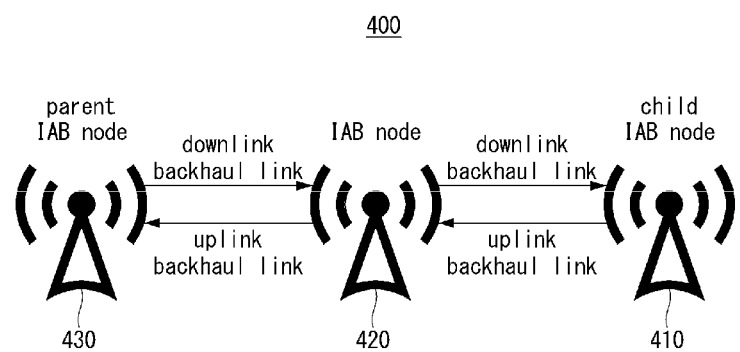
FIG. 3 is a conceptual diagram illustrating a first exemplary embodiment of a connection relationship of an IAB network.

FIG. 3 is a conceptual diagram illustrating a first exemplary embodiment of a connection relationship of an IAB network.

Referring to FIG. 3, an IAB network of a mobile communication system may include an IAB donor and/or at least one IAB node. When an IAB node is connected with a plurality of other IAB nodes via backhaul links, an IAB node having the smallest number of hops from the IAB donor among the plurality of IAB nodes may be referred to as a 'parent IAB node'. An IAB node not having the smallest number of hops from the IAB donor among the plurality of IAB nodes may be referred to as a 'child IAB node'. Each IAB node may have a plurality of child IAB nodes, but may not have a plurality of parent IAB nodes.

The IAB node may transmit data to at least one child IAB node via a downlink (DL) backhaul link, and the IAB node may receive data from at least one child IAB node via an uplink (UL) backhaul link. The IAB node may perform the same role as a base station for at least one child IAB node. That is, the IAB node may perform control on transmission rates of data, routing, hybrid automatic repeat request (HARQ) retransmission, synchronization signal transmission, reference signal transmission, scheduling, channel control, mobility management, and the like for the child IAB nodes. In addition, at least one child IAB node may receive data from the parent IAB node via a DL backhaul link, and at least one child IAB node may transmit data to the parent IAB node via a UL backhaul link. Each of the at least one or more child IAB nodes may perform the same role as a terminal with respect to the parent IAB node.

Figure 4:
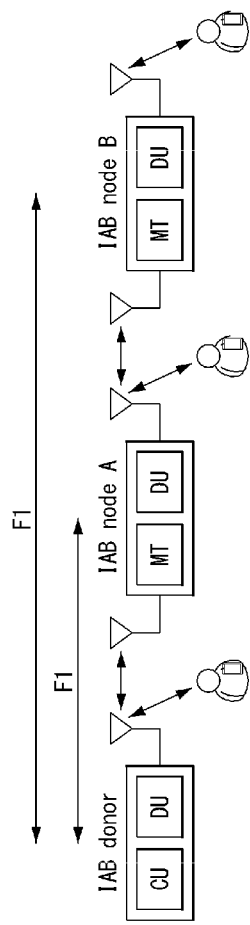
FIG. 4 is a block diagram illustrating a first exemplary embodiment of a multi-hop structure of an IAB network.

FIG. 4 is a block diagram illustrating a first exemplary embodiment of a multi-hop structure of an IAB network.

Referring to FIG. 4, a protocol structure of the IAB donor may be composed of a central unit (CU) and a distributed unit (DU) depending on functions to be performed, and a protocol structure of the IAB node may be composed of a DU and a mobile terminal (MT). The CU of the IAB donor may be connected to a base station, and the DU of the IAB donor may perform functions of a base station for at least one IAB node and/or at least one terminal. The DU of the IAB node may serve as a base station for one or more other IAB nodes, and the MT of the IAB node may serve as a terminal for one or more other IAB nodes.

The MT of at least one IAB node may serve as a terminal for the DU of the IAB donor, and the DU of the IAB donor may serve as a base station for the MT of at least one IAB node. In the IAB network, data may be transmitted through a resource request and allocation procedure between the MT of the IAB node and the DU of the parent IAB node. Exemplary embodiments of the present disclosure may be applied to a mobile communication network having various IAB multi-hop structures as well as the above-described IAB multi-hop structure.

For example, an MT of an IAB node A may serve as a terminal for the IAB donor, and the DU of the IAB donor may serve as a base station for the IAB node A. Also, an MT of an IAB node B may serve as a terminal for a DU of the IAB node A, and the DU of the IAB node A may serve as a base station for the MT of the IAB node B. Referring to FIG. 4, it is assumed that the IAB node and/or IAB donor has the split structure of DU, MT, and/or CU, but exemplary embodiments of the present disclosure may be applied even when each of the IAB node and/or IAB donor does not have such the split structure.

On the other hand, a frequency of the wireless backhaul links of the NR IAB may support both an in-band scheme and an out-band scheme.

Figure 5:
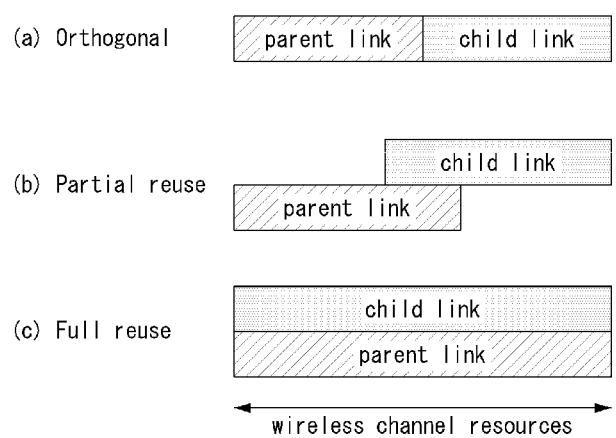
FIG. 5 is a conceptual diagram illustrating a first exemplary embodiment of radio channel resource multiplexing between a parent link and a child link of an IAB node.

FIG. 5 is a conceptual diagram illustrating a first exemplary embodiment of radio channel resource multiplexing between a parent link and a child link of an IAB node.

Referring to FIG. 5, the IAB node may support three radio channel resource multiplexing schemes between a parent link and a child link. In FIG. 5, the X axis may be a time axis. (a) of FIG. 5 shows an orthogonal radio channel resource multiplexing scheme supported by the IAB node between the parent link and the child link, and in this scheme, radio channel resources may not overlap each other because the radio resources are not reused. (b) of FIG. 5 shows a radio channel resource multiplexing scheme based on a partial reuse scheme supported by the IAB node between the parent link and the child link, and in this scheme, radio channel resources may partially overlap by partially reusing the radio resources.

Finally, (c) of FIG. 5 shows a radio channel resource multiplexing scheme based on a full reuse scheme supported by the IAB node between the parent link and the child link, and in this scheme, radio channel resources may fully overlap by fully reusing the radio resources. Here, the orthogonal radio channel resource multiplexing scheme may be the out-band scheme. In addition, the radio channel resource multiplexing scheme based on the partial reuse and the radio channel resource multiplexing scheme based on the full reuse may be the in-band schemes.

When the IAB node operates in the radio channel resource multiplexing scheme based on the partial reuse and the radio channel resource multiplexing scheme based on the full reuse, which correspond to the in-band scheme, multiplexing restrictions and interference problems between an access link and a backhaul link may be considered.

Figure 6:
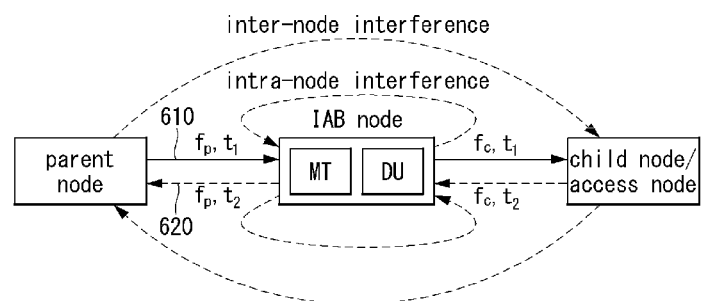
FIG. 6 is a conceptual diagram illustrating interference occurring when an IAB node performs communication in a full-duplex communication scheme based on an in-band scheme.

FIG. 6 is a conceptual diagram illustrating interference occurring when an IAB node performs communication in a full-duplex communication scheme based on an in-band scheme.

Referring to FIG. 6, when the IAB node performs communication in a full-duplex communication scheme and an in-band scheme, inter-node interference and intra-node interference may occur. As an example, the IAB node may perform full-duplex communication in which an MT thereof may operate in a reception mode for receiving a signal transmitted with a transmit power $f_p$ from a parent node at a time $t_1$ as represented by a solid line 610, and a DU thereof may operate in a transmission mode of transmitting a signal with a transmit power $f_c$ to a child node at the time $t_1$. In this case, the transmission signal of the parent node may cause inter-node interference on the reception signal of the child node.

In addition, the transmission signal of the DU may cause intra-node interference on the reception signal of the MT. On the other hand, the IAB node may perform full-duplex communication in which the MT thereof may operate in a transmission mode of transmitting a signal with a transmit power $f_p$ to the parent node at a time $t_2$ as represented by a dotted line 620, and the DU thereof operates in a reception mode of receiving a signal transmitted with a transmit power $f_c$ from the child node at the time $t_2$. In this case, the transmission signal of the parent node may cause inter-node interference on the reception signal of the child node. In addition, the transmission signal of the DU may cause intra-node interference on the reception signal of the MT.

In the above-described situation, the inter-node interference may be similar to interference in a general multiple-input and multiple-output (MIMO) environment, so that it may be relatively easy for the IAB node to manage the inter-node interference. On the other hand, in case of the intra-node interference, a problem in which the IAB node may receive a signal transmitted by itself may occur. When the signal transmitted by the IAB node is received by itself, a reception strength of the signal may be much greater than reception strengths of signals received from other nodes.

As a result, the reception strength may exceed an acceptable range of an automatic gain control (AGC) of the IAB node, and demodulation of the received signal may be difficult due to very severe interference effects. In the IAB node, the MT may perform signal transmission and at the same time, the DU may perform signal reception. Alternatively, in the IAB node, the MT may perform signal reception, and at the same time, the DU may perform signal transmission. In this case, if the IAB node performs DL communication and UL communication by using the same radio resources (e.g., frequency resources and time resources), cross-link interference (CLI) may occur. In this reason, the NR IAB of 3GPP release-16 may support only a multiplexing scheme based on time division multiplexing (TDM).

On the other hand, the 3GPP release-17 IAB work item (WI), which started with the first meeting of radio access network working group 1 (RAN1) 102-e in August 2020, may have a target of providing various technical improvements for increasing a spectral efficiency and reducing a latency, which are applicable to a frequency range 1 (FR1) and a FR2. In this regard, the RAN1 may focus on enhancement of a duplexing scheme, and may be in the process of standardization. To this end, the detailed objectives pursued by the RAN1 may largely include the following two.

Objective 1: Development of specifications for improving the resource multiplexing scheme between a child link and a parent link of an IAB node Objective 2: Development of specifications including timing mode, DL/UL power control, and backhaul link interference measurement to support simultaneous operations of a child link and a parent link of an IAB node As can be seen from the detailed objectives above, the RAN1 wants to develop specifications supporting anon-TDM-based resource multiplexing scheme applicable to a child link and a parent link of an IAB node and detailed techniques required therefor. The non-TDM-based resource multiplexing scheme to be developed by the RAN1 may be largely under discussion on the following four schemes.

Figure 7:
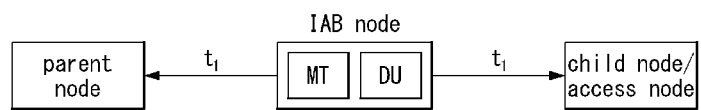
FIG. 7 is a conceptual diagram illustrating a first exemplary embodiment of a non-TDM-based resource multiplexing scheme in an IAB node.

FIG. 7 is a conceptual diagram illustrating a first exemplary embodiment of a non-TDM-based resource multiplexing scheme in an IAB node.

Referring to FIG. 7, in a non-TDM-based resource multiplexing scheme for the IAB node, the MT may operate in a transmission mode of transmitting a signal to the parent node at a time $t_1$, and the DU may also operate in a transmission mode of transmitting a signal to the child node at the time $t_1$.

Figure 8:
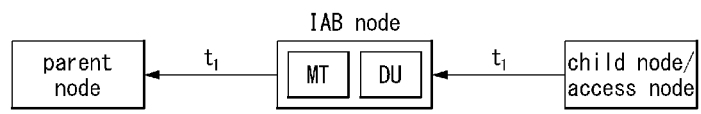
FIG. 8 is a conceptual diagram illustrating a second exemplary embodiment of a non-TDM-based resource multiplexing scheme in an IAB node.

FIG. 8 is a conceptual diagram illustrating a second exemplary embodiment of a non-TDM-based resource multiplexing scheme in an IAB node.

Referring to FIG. 8, in a non-TDM-based resource multiplexing scheme for the IAB node, the MT may operate in a transmission mode for transmitting a signal to the parent node at a time $t_1$, and the DU may operate in a reception mode of receiving a signal from the child node at the time $t_1$.

Figure 9:
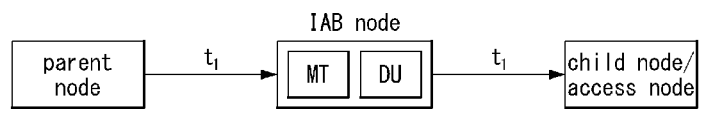
FIG. 9 is a conceptual diagram illustrating a third exemplary embodiment of a non-TDM-based resource multiplexing scheme in an IAB node.

FIG. 9 is a conceptual diagram illustrating a third exemplary embodiment of a non-TDM-based resource multiplexing scheme in an IAB node.

Referring to FIG. 9, in a non-TDM-based resource multiplexing scheme for the IAB node, the MT may operate in a reception mode of receiving a signal from the parent node at a time $t_1$, and the DU may operate in a transmission mode of transmitting a signal to the child node at the time $t_1$.

Figure 10:
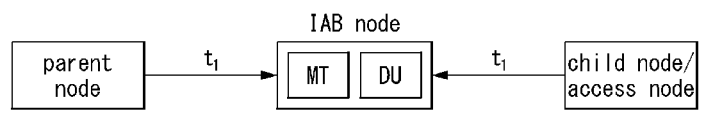
FIG. 10 is a conceptual diagram illustrating a fourth exemplary embodiment of a non-TDM-based resource multiplexing scheme in an IAB node.

FIG. 10 is a conceptual diagram illustrating a fourth exemplary embodiment of a non-TDM-based resource multiplexing scheme in an IAB node.

Referring to FIG. 10, in a non-TDM-based resource multiplexing scheme for the IAB node, the MT may operate in a reception mode of receiving a signal from the parent node at a time $t_1$, and the DU may operate in a reception mode of receiving a signal from the child node at the time $t_1$.

In order for the IAB node to support the various simultaneous operation schemes shown in FIGS. 7 to 10, various communication methods and procedures, such as power control, transmission/reception (TX/RX) timing alignment, and reference signal assignment between the child link and the parent link of the IAB node, may be required to be additionally introduced.

1. Power Control

In order for the IAB node to perform simultaneous operations between the parent link and the child link, power control between the child link and the parent link may be required. There may be three cases where power control is required.

Figure 11:
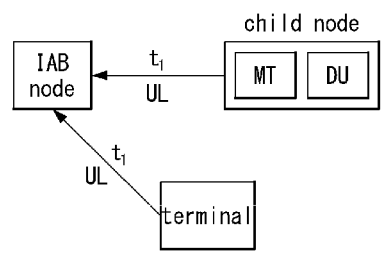
FIG. 11 is a conceptual diagram illustrating a first exemplary embodiment of a case where power control is required in an IAB node.

FIG. 11 is a conceptual diagram illustrating a first exemplary embodiment of a case where power control is required in an IAB node.

Referring to FIG. 11, a case where power control is required in the IAB node may be when the IAB node receives UL signals from the child node and the terminal at the same time (i.e., at the time $t_1$). In this case, since a power of the child node is generally much greater than a power of the terminal, power imbalance may occur between the UL signals received by the IAB node. If the power imbalance between the two signals received by the IAB node is severe, the signal may be distorted in the AGC, which may seriously affect the reception performance. Here, for the case where power control is required in the IAB node, it is assumed that the IAB node receives the UL signals from the child node and the terminal at the same time (i.e., at the time $t_1$), but the case may be applied also when the IAB node receives UL signals from the child node and another child node at the same time (i.e., at the time $t_1$).

Figure 12:
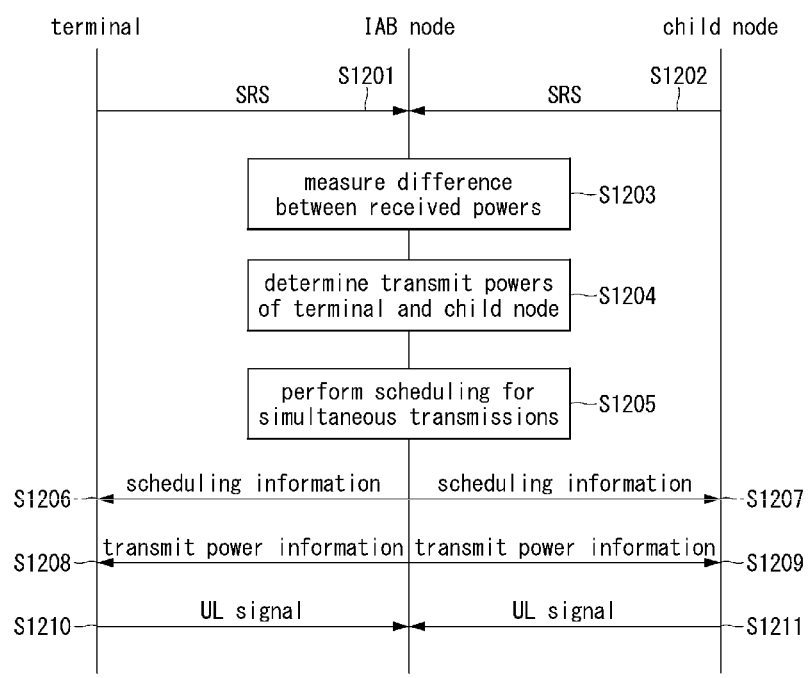
FIG. 12 is a sequence chart illustrating a first exemplary embodiment of a power control method of an IAB node.

FIG. 12 is a sequence chart illustrating a first exemplary embodiment of a power control method of an IAB node.

Referring to FIG. 12, a terminal may periodically transmit a sounding reference signal (SRS) to an IAB node (S1201). In this case, the terminal may transmit a UL power headroom report (PHR) and a buffer status report (BSR) together to the IAB node. Then, the IAB node may receive the SRS, uplink PHR, BSR, and the like from the terminal. In addition, the IAB node may measure a received signal strength of the SRS. Here, the received signal strength may be a received signal strength indicator (RSSI) or the like. Here, the headroom (PH) may indicate an amount of additionally available transmit power in addition to a power currently used by the terminal for UL transmission.

On the other hand, a child node may periodically transmit a SRS to the IAB node (S1202). Here, the child node may be another IAB node connected to a DU of the IAB node. In this case, the child node may transmit a UL PHR and a BSR together to the IAB node. Then, the IAB node may receive the SRS, PHR, BSR, and the like from the child node. In addition, the IAB node may measure a received signal strength of the SRS. Here, the received signal strength may be a RSSI or the like. In this case, the headroom (PH) may indicate an amount of additionally available transmit power in addition to a power currently used by the child node for UL transmission.

As described above, the IAB node may receive a signal from the terminal and measure a received signal strength, receive a signal from the child node and measure a received signal strength, and measure a difference $P_{diff}$ between received powers of the two signals by using the measured received signal strengths (S1203). Then, in consideration of the PH information received from the child node and the terminal, the IAB node may determine a transmit power of the terminal, and may determine a transmit power of the child node (S1204). In this case, if the terminal transmits a signal with the determined transmit power and the child node transmits a signal with the determined transmit power, the IAB node may determine the transmit powers so that a difference between received powers of two signals at the IAB node does not exceed a first threshold $P_{imb}$, which is a threshold for preventing signal distortion at the AGC of the IAB node.

Thereafter, the IAB node may schedule the terminal and the child node to simultaneously perform UL transmissions (S1205). Then, the IAB node may transmit scheduling information to the terminal and the child node (S1206, S1207). In addition, the IAB node may inform the determined transmit powers to the terminal and the child node (S1208, S1209). Here, the IAB node may be implemented to separately transmit the scheduling information and the transmit power information to the terminal and the child node, but it may be implemented to transmit them simultaneously. Thereafter, the IAB node may receive UL signals transmitted using the determined transmit powers from the terminal and the child node (S1210, S1211).

On the other hand, the IAB node may periodically measure the difference $P_{diff}$ between the received powers that changes as the terminal or child node moves from the time when the simultaneous receptions started. In addition, the IAB node may periodically perform UL power control for the terminal and the child node so that the measured power difference does not exceed the threshold $P_{imb}$. However, if the power difference exceeds a second threshold, which is a threshold for a power difference that cannot be overcome by UL power control, the IAB node may switch the two links from the non-TDM scheme to a TDM scheme.

Here, the case where power control is required in the IAB node assumes that the IAB node receives UL signals from the child node and the terminal at the same time (i.e., at the time $t_1$), but the case may be applied also when the IAB node receives UL signals from the child node and another child node at the same time (i.e., at the time $t_1$).

Figure 13:
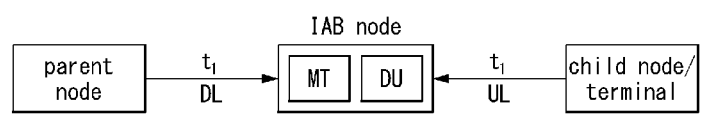
FIG. 13 is a conceptual diagram illustrating a second exemplary embodiment of a case where power control is required in an IAB node.

FIG. 13 is a conceptual diagram illustrating a second exemplary embodiment of a case where power control is required in an IAB node.

Referring to FIG. 13, a case where power control is required in the IAB node may be when the IAB node receives a DL signal from a parent node and a UL signal from a child node at the same time (i.e., at the time $t_1$). In this case, the parent node may be another IAB node connected to a MT of the IAB node, and the child node may be another IAB node connected to a DU of the IAB node. In this case, since the DU (of the parent node) can operate a higher transmit power than the MT (of the child node), the IAB node may receive the DL signal from the parent node with a higher strength than the UL signal from the child node, which may cause a power imbalance problem. Also, the signal may be distorted at the AGC.

In this case, the IAB node may solve the power imbalance problem by allowing one of the parent node and the child node to increase or decrease its transmit power. To this end, the IAB node may periodically compare received signal strengths for the parent node and the child node measured at the MT and the DU, respectively, and may receive PH information from the child node. When the measured received signal strengths are unbalanced (i.e., when a difference $P_{diff}$ between the received signal strength of the UL signal and the received signal strength of the DL signal exceeds a first threshold $P_{imb}$ ($P_{diff} > P_{imb}$)), the IAB node may transmit a request on whether DL power control is possible to the parent node before scheduling for simultaneous UL/DL receptions, and may receive a response thereto and information on an adjustable DL power range through DL control information. The IAB node may receive a response indicating that power control is possible from the parent node, and may perform appropriate power control so that $P_{diff}$ does not exceed $P_{imb}$ in consideration of the information on the adjustable DL power range and the PH information of the child node. Thereafter, the IAB node may schedule the UL of the child node and the DL of the parent node at the same time.

Figure 14:
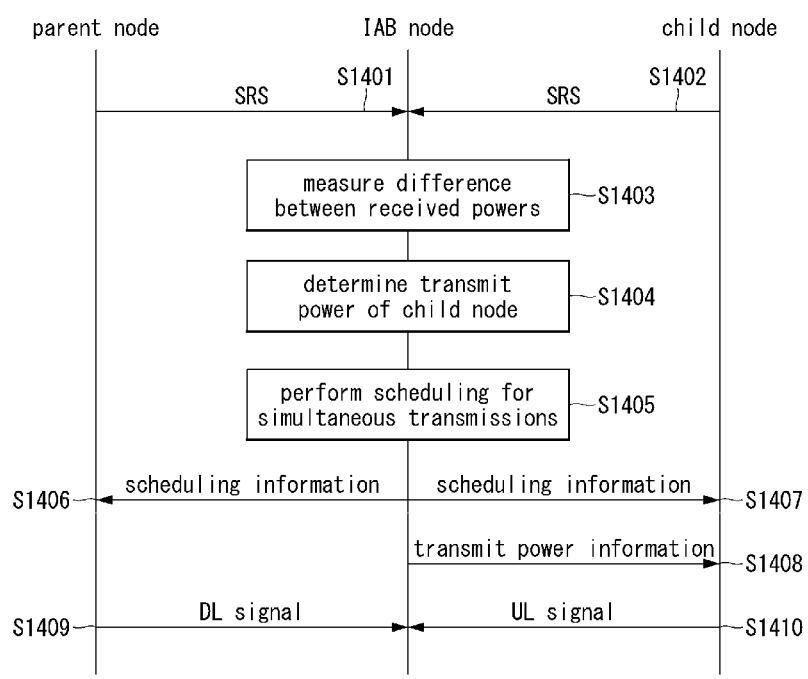
FIG. 14 is a sequence chart illustrating a second exemplary embodiment of a power control method of an IAB node.

FIG. 14 is a sequence chart illustrating a second exemplary embodiment of a power control method of an IAB node.

Referring to FIG. 14, a parent node may periodically transmit a SRS to an IAB node (S1401). Then, the IAB node may receive the SRS from the parent node. In addition, the IAB node may measure a received signal strength of the SRS. Here, the received signal strength may be a RSSI or the like. Here, the parent node may be another IAB node connected to a MT of the IAB node.

On the other hand, a child node may periodically transmit a SRS to the IAB node (S1402). Here, the child node may be another IAB node connected to a DU of the IAB node. In this case, the child node may transmit an uplink PHR and a BSR together to the IAB node. Then, the IAB node may receive the SRS, PHR, BSR, and the like from the child node. In addition, the IAB node may measure a received signal strength of the SRS. Here, the received signal strength may be a RSSI or the like. In this case, the headroom (PH) may indicate an amount of additionally available transmit power in addition to a power currently used by the child node for UL transmission.

As described above, the IAB node may receive a signal from the parent node and measure a received signal strength, receive a signal from the child node and measure a received signal strength, and measure a difference $P_{diff}$ between received powers of the two signals by using the measured received signal strengths (S1403). In this case, the IAB node may determine whether the difference between received powers exceeds a first threshold $P_{imb}$. As a result of the determination, if the difference exceeds the first threshold, the IAB node may adjust the transmit power of the child node so that the power difference does not exceed the first threshold in consideration of the PH information received from the child node (S1404).

Thereafter, the IAB node may schedule the parent node and the child node to simultaneously perform transmissions (S1405). Then, the IAB node may transmit scheduling information to the parent node and the child node (S1406, S1407). In addition, the IAB node may inform the determined transmit power to the child node (S1408). Thereafter, the IAB node may receive a DL signal from the parent node (S1409). Also, the IAB node may receive a UL signal from the child node (S1410).

On the other hand, although the IAB node adjusts the transmit power of the child node based on the PH information of the child node and the like, a power imbalance may occur again and $P_{diff}$ may exceed $P_{imb}$. In addition, although the power imbalance was solved by the IAB node adjusting the transmit power of the child node based on the PH information of the child node and the like, the power difference $P_{diff}$ may be almost close to the first threshold as shown in Equation 1 below, and a period during which such the case maintains may last for a certain period of time. Here, α may be defined as α≤0, and its absolute value may not be a large value (e.g., less than 5). In this case, the IAB node may operate as shown in FIG. 15 below.

$$P_{diff} > P_{imb} + a \qquad \text{[Equation 1]}$$

Figure 15:
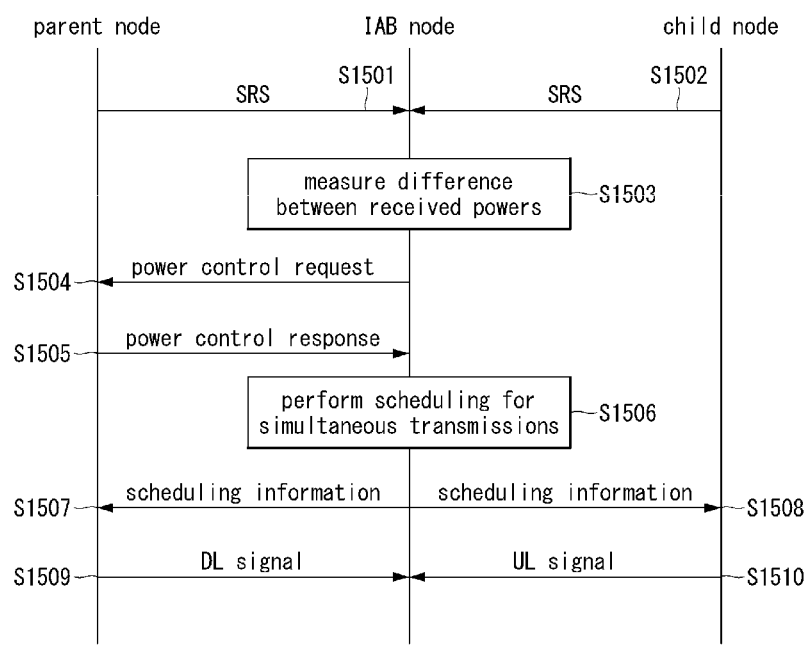
FIG. 15 is a sequence chart illustrating a third exemplary embodiment of a power control method of an IAB node.

FIG. 15 is a sequence chart illustrating a third exemplary embodiment of a power control method of an IAB node.

Referring to FIG. 15, a parent node may periodically transmit a SRS to an IAB node (S1501). Then, the IAB node may receive the SRS from the parent node. In addition, the IAB node may measure a received signal strength of the SRS. Here, the received signal strength may be a RSSI or the like. Here, the parent node may be another IAB node connected to a MT of the IAB node.

On the other hand, a child node may periodically transmit a SRS to the IAB node (S1502). Here, the child node may be another IAB node connected to a DU of the IAB node. In this case, the child node may transmit a UL PHR and a BSR together to the IAB node. Then, the IAB node may receive the SRS, PHR, BSR, and the like from the child node. In addition, the IAB node may measure a received signal strength of the SRS. Here, the received signal strength may be a RSSI or the like. In this case, the headroom (PH) may indicate an amount of additionally available transmit power in addition to a power currently used by the child node for UL transmission.

As described above, the IAB node may receive a signal from the parent node and measure a received signal strength, receive a signal from the child node and measure a received signal strength, and measure a difference $P_{diff}$ between received powers of the two signals by using the measured received signal strengths (S1503). In this case, the IAB node may determine whether the difference between received powers exceeds a first threshold $P_{imb}$. As a result of the determination, if the difference exceeds the first threshold, the IAB node may adjust the transmit power of the terminal by increasing the transmit power of the child node (or terminal) so that the power difference does not exceed the first threshold in consideration of the PH information received from the child node (S1404).

However, although the IAB node adjusts the transmit power of the child node based on the PH information of the child node and the like, a power imbalance may occur again and $P_{diff}$ may exceed $P_{imb}$. The power difference $P_{diff}$ may be almost close to the first threshold as shown in Equation 1 below, and a period during which such the case maintains may last for a certain period of time. In this case, the IAB node may make a power control request to the parent node (S1504). In this case, the power control request transmitted by the IAB node to the parent node may include information on an adjustable power adjustment range and information indicating to adjust the transmit power within the power adjustment range.

Accordingly, the parent node may receive, from the IAB node, the power control request including information on the power adjustment range and information indicating to adjust the transmit power within the power adjustment range. In addition, when it is possible to adjust the transmit power within the power adjustment range requested by the IAB node, the parent node may adjust the transmit power to a transmit power within the requested power adjustment range, and transmit a power control response indicating that adjustment of the transmit power is completed to the IAB node (S1505). Accordingly, the IAB node may receive the power control response, and may identify completion of the transmission power adjustment in the received power control response. Thereafter, the IAB node may schedule the parent node and the child node to transmit signals at the same time (S1506).

Then, the IAB node may transmit scheduling information to the parent node and the child node (S1507, S1508). Thereafter, the IAB node may receive a DL signal from the parent node (S1509). Also, the IAB node may receive a UL signal from the child node (S1510). In this case, the parent node may transmit the signal to the IAB node by using the adjusted transmit power.

Here, the parent node was described as being implemented to receive the information on the power adjustment range from the IAB node, and adjust the transmit power within the received power adjustment range, but the IAB node may be implemented to receive information on a power adjustment range from the parent node, select a transmit power within the received power adjustment range, and inform the selected transmit power to the parent node. To this end, the IAB node may include a request for the power adjustment range and an inquiry about whether the transmit power can be adjusted in the power control request transmitted to the parent node in the step S1504.

Accordingly, the parent node may receive the power control request including the request for the power adjustment range and the inquiry about whether the transmit power can be adjusted to a transmit power within the power adjustment range. In addition, when the transmit power can be adjusted, the parent node may transmit a power control response including the information on the power adjustment range and the information indicating that the transmit power can be adjusted to the IAB node. Accordingly, the IAB node may receive the power control response and may identify the power adjustment range and the response indicating that the transmit power can be adjusted in the received power control response.

Thereafter, the IAB node may select a transmit power from the power adjustment range received from the parent node so that the difference between received powers does not exceed the first threshold. In addition, the IAB node may indicate the transmit power to be adjusted while notifying the selected transmit power to the parent node. Then, the parent node may adjust the transmit power according to the indication received from the IAB node. Thereafter, the IAB node may schedule the parent node and the child node to simultaneously perform transmissions. In addition, the IAB node may transmit scheduling information to the parent node and the child node. In addition, the IAB node may notify the adjusted transmit power to the parent node. Thereafter, the IAB node may receive signals from the parent node and the child node. In this case, the parent node may transmit the signal to the IAB node by using the adjusted transmit power.

Meanwhile, as described above, the IAB node may request power control from the parent node through a UL control channel to lower a DL transmit power of the parent node. The IAB node may periodically make such the power control request to the parent node. Accordingly, the parent node may periodically receive the power control request from the IAB node, and may adjust its transmit power by a requested amount. If the requested amount exceeds the adjustable range, the parent node may notify it to the IAB node again. Then, the IAB node may stop scheduling of the simultaneous operations. In this case, the parent node may directly transmit a stop command to the IAB node.

On the other hand, unlike the above-described procedure, the IAB node may inform the parent node of measured UL and DL signal qualities (or difference between received powers) and PH information. Then, the parent node may receive the UL and DL signal qualities (or difference between received powers) and PH information from the IAB node. In addition, the parent node may determine a transmit power of the parent node and a transmit power of the child node based on the information on the signal qualities and the PH information received from the IAB node.

In addition, the parent node may transmit information on the determined transmit power for the child node to the child node through the IAB node. In addition, the parent node may schedule simultaneous transmissions to the IAB node and the child node, and may transmit scheduling information to the IAB node and the child node. In this case, the parent node may schedule the UL transmission of the child node by using a 2-stage UL grant (i.e., including a first UL grant (delivered from the parent node to the IAB node) and a second UL grant (delivered from the IAB node to the child node)).

Figure 16:
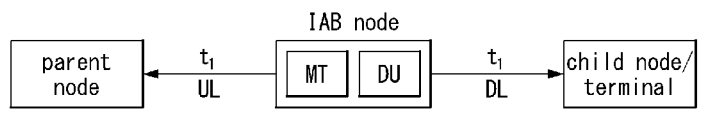
FIG. 16 is a conceptual diagram illustrating a third exemplary embodiment of a case where power control is required in an IAB node.

FIG. 16 is a conceptual diagram illustrating a third exemplary embodiment of a case where power control is required in an IAB node.

Referring to FIG. 16, a case where power control is required in the IAB node may be when the IAB node transmits a UL signal to a parent node and a DL signal to a child node at the same time (i.e., at the time $t_1$). In this case, the parent child node may be another IAB node connected to a MT of the IAB node. The child node may be another IAB node connected to a DU of the IAB node. In this case, since a power of the signal transmitted to the parent node is generally much greater than a power of the signal transmitted to the child node, a power imbalance between the UL signal and the DL signal may occur in the IAB node.

When the power imbalance between the two signals transmitted by the IAB node is severe, the signal may be distorted at the AGC, which may seriously affect the reception performance. In such the case, if the parent node increases or decreases the UL transmit power of the IAB node, the DL transmit power of the IAB node may decrease or increase accordingly, and in this reason, an appropriate transmit power allocation between UL and DL of the IAB node should be considered. This situation may generally occur when the MT and DU of the IAB node use the same antenna panel.

Figure 17:
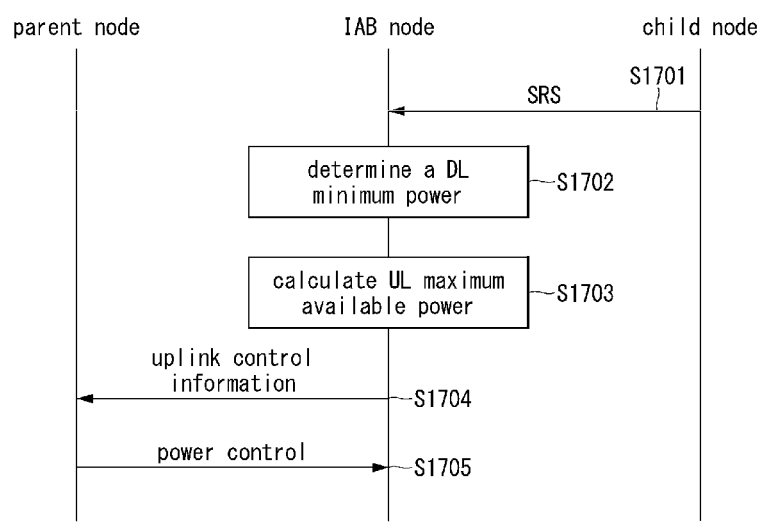
FIG. 17 is a sequence chart illustrating a fourth exemplary embodiment of a power control method of an IAB node.

FIG. 17 is a sequence chart illustrating a fourth exemplary embodiment of a power control method of an IAB node.

Referring to FIG. 17, in a power control method in an IAB node, a child node may periodically transmit a SRS to the IAB node (S1701). In addition, the IAB node may measure a received signal strength of the SRS. Here, the received signal strength may be a RSSI or the like. Accordingly, the IAB node may determine a DL minimum power $P_{DL,min}$ required for DL transmission based on the measured received signal strength (S1702). Then, the IAB node may calculate a UL available power $P_{UL,max}$ by subtracting the DL minimum power $P_{DL,min}$ from a UL maximum power $P_{TX,max}$ that is a maximum power available for UL transmission (S1703).

$$P_{UL,max} = P_{TX,max} - P_{DL,min} \qquad \text{[Equation 2]}$$

Thereafter, the IAB node may inform the parent node of the available UL power through uplink control information (e.g., UCI) (S1704). Accordingly, the parent node may receive the uplink control information from the IAB node, and may identify the available UL power included in the received uplink control information. Thereafter, the parent node may select a transmit power within a range that does not exceed the available UL power and inform the IAB node of information on the selected transmit power to perform power control (S1705). Accordingly, the IAB node may transmit a UL signal using the transmit power according to the information on the selected transmit power received from the parent node.

On the other hand, the IAB node may use a scheme of reporting a PH differently from the method described above. In this case, when calculating the PH to be reported to the parent node, the IAB node may calculate the PH by considering the previously described value $P_{DL,min}$ in addition to a power $P_{UL,current}$ currently being used for UL transmission as in Equation 3, and may inform the parent node of the calculated PH.

$$PH = P_{TX,max} - P_{UL,current} - P_{DL,min} \qquad \text{[Equation 3]}$$

Here, as described above, the IAB node may determine $P_{DL,min}$ by measuring a channel quality of UL with the child node. However, unlike this, the child node may measure a DL signal (e.g., downlink reference signal) and report it to the IAB node, and the IAB node may determine $P_{DL,min}$ based on the reported measurement value of the DL signal received from the child node. That is, the IAB node may transmit a DL reference signal to the child node. Then, the child node may measure a received signal strength by receiving the DL reference signal. In addition, the child node may inform the IAB node of a measured received signal strength of the DL reference signal.

2. IAB Node Timing Alignment

According to a section 7.4 of a technical report (TR) 38.874 of the 3GPP release-16 NR IAB study item (SI), the NR IAB may basically support transmission timing alignment between an IAB node and an IAB donor, which corresponds to a case 1 among seven timing alignment cases. That is, both the IAB donor and the IAB node may have the same DL transmission timing. On the other hand, in the release-17 IAB, support of the four non-TDM-based multiplexing schemes in the IAB node are under discussion.

Referring again to FIG. 8, in the non-TDM-based resource multiplexing scheme of FIG. 8, the IAB node may operate in a transmission mode of transmitting a signal to the parent node, and operate in a reception mode of receiving a signal from the child node. In such the non-TDM-based resource multiplexing scheme, a transmission timing when the IAB node transmits a signal to the parent node may be aligned with a reception timing when the IAB node receives a signal from the child node. In this case, when the UL transmission timing is changed according to the UL reception timing of the child node, the IAB node may need to inform the parent node of the change. In addition, when there are a plurality of child nodes, the IAB node may have a disadvantage in that a reception timing therefor cannot be matched with all child nodes. Accordingly, the IAB node may adjust the reception timing when receiving a signal from the child node to the transmission timing when transmitting a signal to the parent node. In this case, the IAB node may align the UL reception timing with the UL transmission timing of the IAB node by allowing one or more connected child nodes to transmit UL signals through timing advance (TA).

Figure 18:
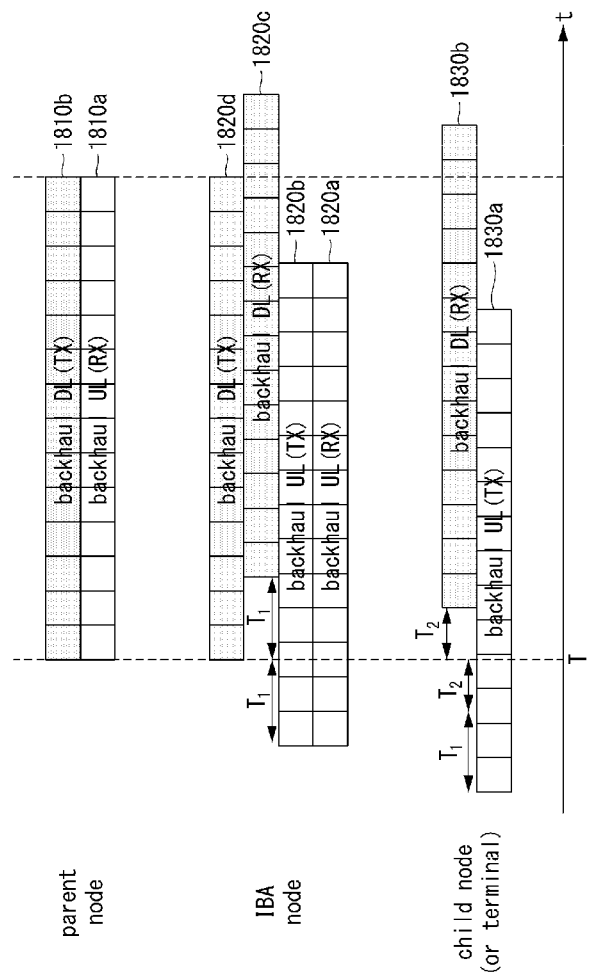
FIG. 18 is a conceptual diagram illustrating a first exemplary embodiment of an IAB node timing alignment method.

FIG. 18 is a conceptual diagram illustrating a first exemplary embodiment of an IAB node timing alignment method.

Referring to FIG. 18, in an IAB node timing alignment method, an IAB node may transmit a backhaul UL subframe 1820b at a backhaul UL transmission timing (i.e., T-T1) that is earlier by T1 than a backhaul UL reception timing T, so that a parent node receives the backhaul UL subframe 1820b at the backhaul UL reception timing T. Then, the parent node may receive a backhaul UL subframe 1810a at the backhaul UL reception timing T. Here, the time T1 may be determined using a round trip time (RTT) between the parent node and the IAB node. The parent node may identify T1 of the IAB node through a random access channel (RACH) procedure, etc.

Accordingly, the parent node may inform T1 to the IAB node. Here, although the parent node is configured to inform the IAB node of T1, the IAB node may identify the time T1 by receiving a backhaul DL subframe 1810b from the parent node. That is, the parent node may include a backhaul DL transmission timing T in the backhaul DL subframe 1810b and transmit it to the IAB node. Then, the IAB node may receive a backhaul DL subframe 1820c at a timing delayed by the time T1, and may identify the transmission timing T included in the received backhaul DL subframe 1820c.

Here, the backhaul UL subframe 1810a and the backhaul UL subframe 1820b may be the same, and the backhaul DL subframe 1810b and the backhaul DL subframe 1820c may be the same.

Meanwhile, a child node may transmit a backhaul UL subframe 1830a at a backhaul UL transmission timing (i.e., T-T1-T2) that is earlier by (T1+T2) than a backhaul UL reception timing T, so that the IAB node receives the backhaul UL subframe 1830a at a backhaul UL reception timing T-T1. Then, the IAB node may receive a backhaul UL subframe 1820a at the backhaul UL reception timing T-T1. Here, the time T2 may be determined using a RTT between the child node and the IAB node. The IAB node may identify T2 through a RACH procedure, etc.

Accordingly, the IAB node may inform T2 to the child node. Here, although the IAB node is configured to inform the child node of T2, the child node may identify the time T2 by receiving a backhaul DL subframe 1820d from the IAB node. That is, the IAB node may include the backhaul DL transmission timing T in the backhaul DL subframe 1820d and transmit it to the child node. Then, the child node may receive a backhaul DL subframe 1830b at a timing delayed by the time T2, and may identify the transmission timing T included in the received backhaul DL subframe 1830b to determine the time T2. Here, the backhaul uplink subframe 1820a and the backhaul uplink subframe 1830a may be the same, and the backhaul downlink subframe 1820d and the backhaul downlink subframe 1830b may be the same.

Figure 19:
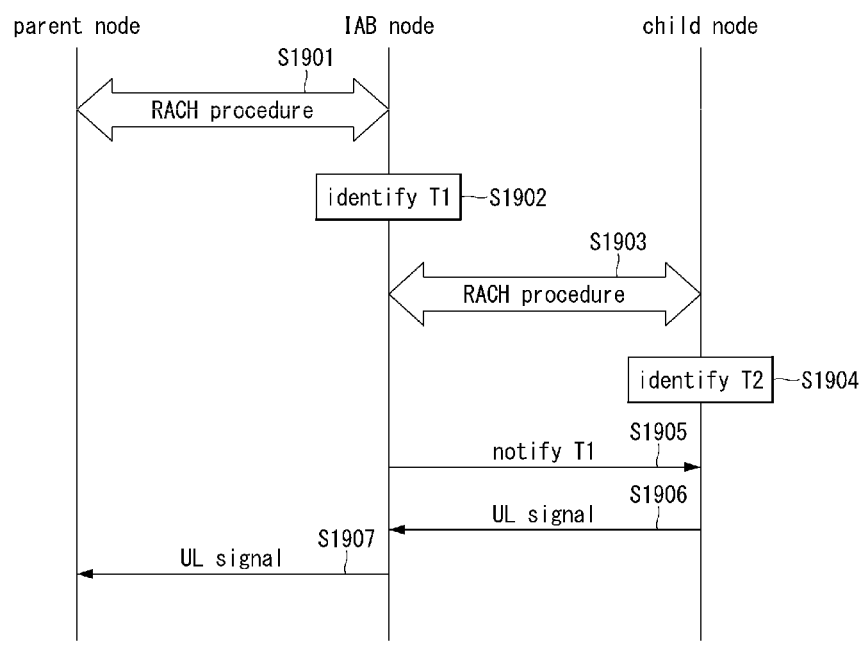
FIG. 19 is a sequence chart illustrating a first exemplary embodiment of an IAB node timing alignment method.

FIG. 19 is a sequence chart illustrating a first exemplary embodiment of an IAB node timing alignment method.

Referring to FIG. 19, in an IAB node timing alignment method, the parent node may perform a RACH procedure with the IAB node (S1901). Then, the IAB node may determine a RTT through the RACH procedure, and may determine T1 from the identified RTT (S1902). On the other hand, the IAB node may proceed with a RACH procedure with the child node (S1903). Then, the child node may determine a RTT through the RACH procedure, and may determine T2 from the identified RTT (S1904). Then, the IAB node may inform T1 to the child node (S1905).

Then, the child node may transmit a backhaul UL subframe, which is a backhaul UL signal, to the IAB node by shifting a transmission timing to be earlier by (T1+T2) (S1906). Then, the IAB node may receive the backhaul UL subframe from the child node at a timing (T-T1) earlier than the timing T. On the other hand, the IAB node may transmit a backhaul UL subframe, which is a backhaul UL signal, to the parent node at a transmission timing earlier by T1 than the timing T (S1907). Then, the parent node may receive the backhaul UL subframe from the IAB node at the timing T.

Meanwhile, when the IAB node moves or is reconnected to another parent node, T1 may be changed, and the UL transmission timing of the IAB node may be changed. This may mean that the UL reception timing of the IAB node should also be changed accordingly.

However, one or more child nodes or terminals connected to the corresponding IAB node may not be able to know this information. Therefore, the IAB node may periodically inform a timing difference $T_{diff}$ of T1, which is changed as it moves or is connected to another parent node, to the child nodes and terminals through downlink control information (DCI) or a medium access control (MAC) control element (CE). Here, when $T_{1,new}$ denotes a new T1 and $T_{1,old}$ denotes an old T1, $T_{diff}$ may be calculated as in Equation 4 below.

$$T_{diff} = T_{1,new} - T_{1,old} \qquad \text{[Equation 4]}$$

Alternatively, the IAB node may periodically inform the child nodes and terminals of T1, which is changed as it moves or is connected to another parent node, through DCI or a MAC CE. If the timing difference $T_{diff}$ of T1 is too large and out of a range of TA values that the IAB node can notify to the child node, the changed $T_{1,new}$ may be notified to the child nodes in other forms of DCI or MAC CE, or the IAB node may instruct the child node to identify T1 again by using a RTT through a RACH procedure.

Meanwhile, referring again to FIG. 18, when the UL transmission timing and the DL reception timing of the IAB node are aligned, a case may occur in which the child node or the terminal excessively advances its transmission timing. In order to solve this problem, the parent node and the IAB node may use a method shown in FIG. 20.

Figure 20:
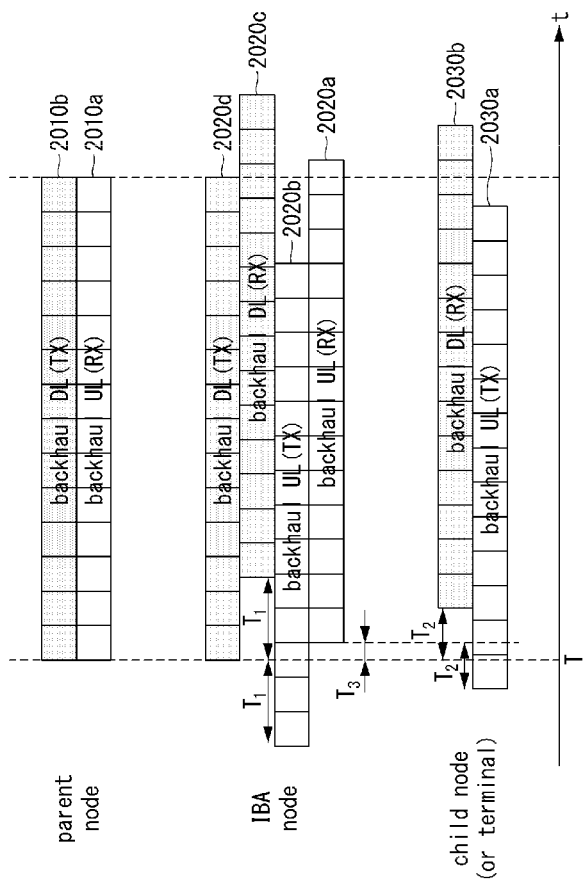
FIG. 20 is a conceptual diagram illustrating a second exemplary embodiment of an IAB node timing alignment method.

FIG. 20 is a conceptual diagram illustrating a second exemplary embodiment of an IAB node timing alignment method.

Referring to FIG. 20, in an IAB node timing alignment method, an IAB node may transmit a backhaul UL subframe 2020b at a backhaul UL transmission timing (i.e., T-T1) that is earlier by T1 than a backhaul UL reception timing T, so that a parent node receives the backhaul UL subframe 2020b at the backhaul UL reception timing T. Then, the parent node may receive a backhaul UL subframe 2010a at the backhaul UL reception timing T.

Here, the time T1 may be determined using a RTT between the parent node and the IAB node. The parent node may identify T1 of the IAB node through a RACH procedure, etc. Accordingly, the parent node may inform T1 to the IAB node. Here, although the parent node is configured to inform the IAB node of $T_1$, the IAB node may identify the time T1 by receiving a backhaul DL subframe 2010b from the parent node. That is, the parent node may include the backhaul DL transmission timing T in the backhaul DL subframe 2010b and transmit it to the IAB node.

Then, the IAB node may receive a backhaul DL subframe 2020c at a timing delayed by the time T1, and may identify the transmission timing T included in the received backhaul DL subframe 2020c to determine the time T1. Here, the backhaul UL subframe 2010a and the backhaul UL subframe 2020b may be the same, and the backhaul DL subframe 2010b and the backhaul DL subframe 2020c may be the same.

Meanwhile, a child node may transmit a backhaul UL subframe 2030a at a backhaul UL transmission timing (i.e., T-T2-T3) that is earlier by (T2-T3) than the timing T, so that the IAB node receives the backhaul UL subframe 2030a at the backhaul UL reception timing T+T3. Then, the IAB node may receive a backhaul UL subframe 2020a at the backhaul UL reception timing T+T3 delayed by the time T3 than the timing T.

Here, the time T2 may be determined using a RTT between the child node and the IAB node. The IAB node may identify T2 of the child node through a RACH procedure, etc. Accordingly, the IAB node may inform T2 to the child node. Here, although the IAB node is configured to inform the child node of T2, the child node may identify the time T2 by receiving a backhaul DL subframe 2020d from the IAB node.

That is, the IAB node may include the backhaul DL transmission timing T in the backhaul DL subframe 2020d and transmit it to the child node. Then, the child node may receive a backhaul DL subframe 2030b at a timing delayed by the time T2, and may identify the transmission timing T included in the received backhaul DL subframe 2030b to determine the time T2. Here, the backhaul UL subframe 2020a and the backhaul UL subframe 2030a may be the same, and the backhaul DL subframe 2020d and the backhaul DL subframe 2030b may be the same.

Meanwhile, the time T3 may be expressed by Equation 5 below. Here, 'mod' may denote a modulo operation. $T_{symb}$ may be a symbol length.

$$T3 = T_{symb} - (T1 \bmod T_{symb}) \quad \text{[Equation 5]}$$

In this manner, the time T3 may be calculated by subtracting a remainder value obtained by dividing T1 by the symbol length from the symbol length. Accordingly, the backhaul UL reception timing of the IAB node may coincide with a starting time of any one symbol of the UL subframe 2020b transmitted according to the backhaul UL transmission timing T1 of the IAB node.

Figure 21:
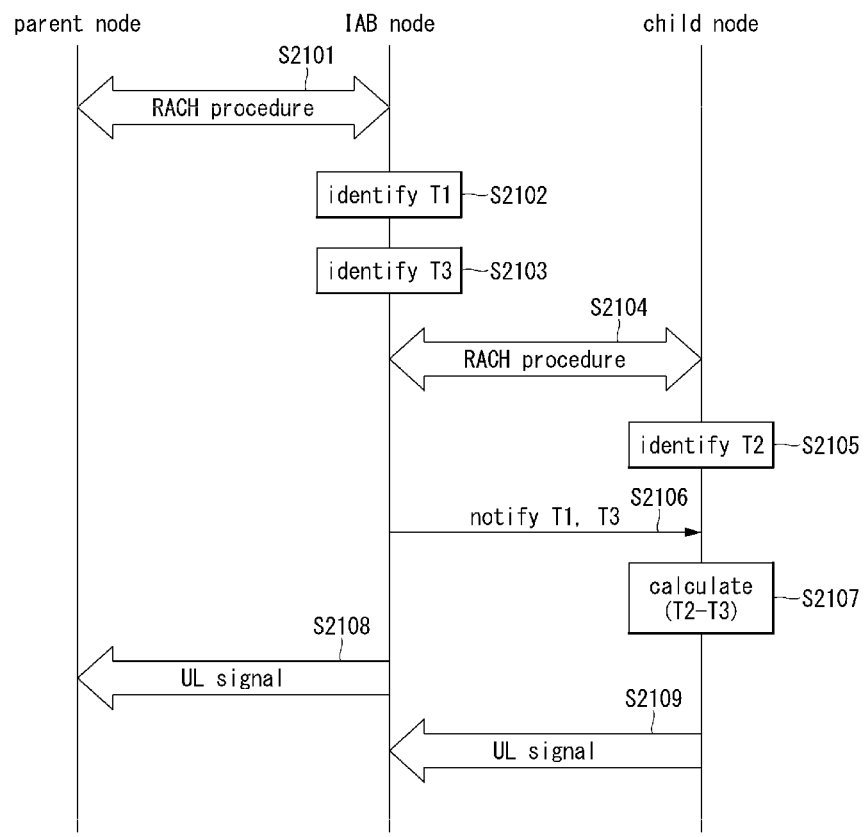
FIG. 21 is a sequence chart illustrating a second exemplary embodiment of an IAB node timing alignment method.

FIG. 21 is a sequence chart illustrating a second exemplary embodiment of an IAB node timing alignment method.

Referring to FIG. 21, in an IAB node timing alignment method, the parent node may perform a RACH procedure with the IAB node (S2101). Then, the IAB node may determine a RTT through the RACH procedure, and may determine T1 from the identified RTT (S2102). The IAB node may identify T3 by calculating T3 by subtracting a remainder value obtained by dividing T1 by the symbol length from the symbol length (S2103).

On the other hand, the IAB node may proceed with a RACH procedure with the child node (S2104). Then, the child node may determine a RTT through the RACH procedure, and may determine T2 from the identified RTT (S2105). Then, the IAB node may inform T1 and T3 to the child node (S2106). Then, the child node may calculate T2-T3 by subtracting the time T3 from the time T2 (S2107). Meanwhile, the IAB node may start transmission of a backhaul UL subframe, which is a backhaul UL signal, to the parent node at a transmission timing earlier by the time T1 from the timing T (S2108).

In this case, the child node may transmit the backhaul UL subframe, which is a backhaul UL signal, to the IAB node by shifting a transmission timing to be earlier by (T2-T3) (S2109). Then, the IAB node may receive a backhaul UL subframe from the child node while transmitting the backhaul UL subframe to the parent node. Accordingly, the IAB node may transmit some data in the backhaul UL subframe received from the child node by including it in the backhaul UL subframe transmitted to the parent node.

3. Reference Signal Assignment

When the IAB node can transmit a signal to the parent node and receive a signal from the child node, the signal transmitted to the parent node may interfere with the signal received from the child node. A reference signal (e.g., demodulation reference signal (DMRS), sounding reference signal (SRS)) carried in the signal transmitted by the IAB node to the parent node may be orthogonal to a reference signal carried in the signal received by the IAB node from the child node.

Then, the IAB node may estimate a channel of the UL transmission signal of the MT of the IAB node received in the DU of the IAB node or may measure a channel quality thereof. The IAB node may make the two reference signals orthogonal by applying a TDM scheme and/or a frequency division multiplexing (FDM) scheme, but it may be inefficient. Accordingly, the IAB node may configure the reference signals of the UL transmission signal of the MT of the IAB node and the UL reception signal of the DU of the IAB node to have the same pattern in time and frequency axes.

Figure 22:
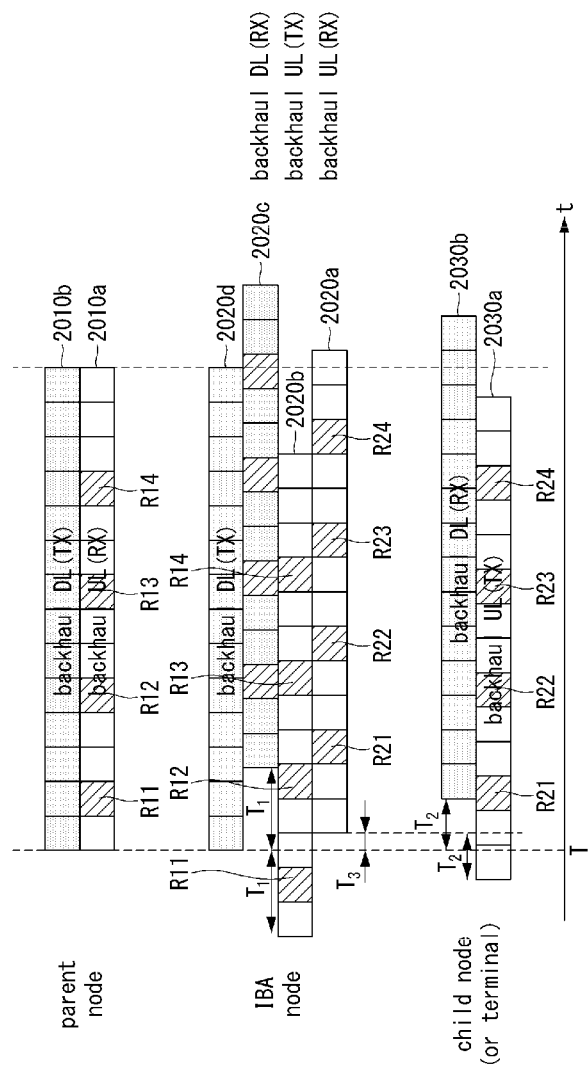
FIG. 22 is a conceptual diagram illustrating a first exemplary embodiment when reference signals are not aligned in an IAB node.

FIG. 22 is a conceptual diagram illustrating a first exemplary embodiment when reference signals are not aligned in an IAB node.

Referring to FIG. 22, the IAB node may transmit a backhaul UL subframe 2020b including reference signals R21 to R24 in the second symbol, fifth symbol, eighth symbol, and eleventh symbol to the parent node. Then, the parent node may receive a backhaul uplink subframe 2010a including the reference signals R21 to R24 in the second symbol, fifth symbol, eighth symbol, and eleventh symbol from the IAB node. In this case, the child node may transmit a backhaul UL subframe 2030a including reference signals R11 to R14 in the third symbol, the sixth symbol, the ninth symbol, and the twelfth symbol to the IAB node.

Accordingly, the IAB node may receive a backhaul UL subframe 2020a including the reference signals R11 to R14 in the third symbol, the sixth symbol, the ninth symbol, and the twelfth symbol from the child node. In such the situation, the reference signals R11 to R14 carried in the backhaul DL subframe 2020b transmitted by the IAB node to the parent node may not be aligned with the reference signals R21 to R24 carried in the backhaul UL subframe 2020a received from the child node.

In order to solve this problem, the IAB node may maintain the configuration of the reference signals R11 to R14 carried in the backhaul UL subframe 2020b transmitted to the parent node, and move the reference signals R21 to R24 carried in the backhaul UL subframe 2020a received from the child node.

Figure 23:
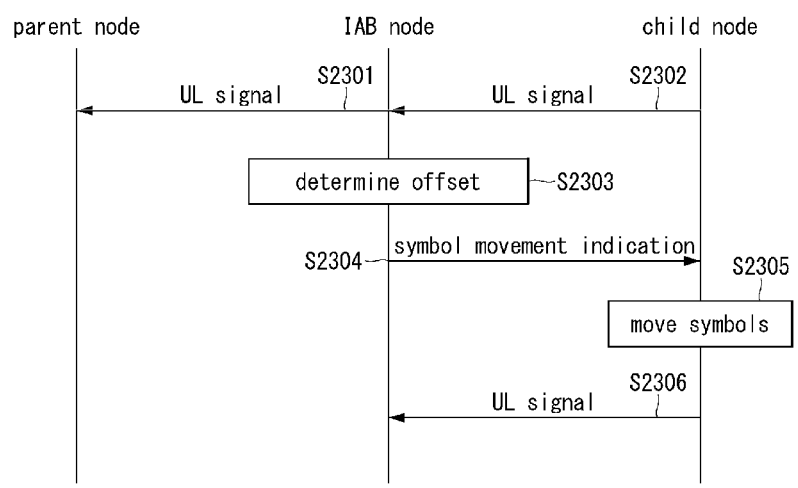
FIG. 23 is a sequence chart illustrating a first exemplary embodiment of a reference signal alignment method of an IAB node.

FIG. 23 is a sequence chart illustrating a first exemplary embodiment of a reference signal alignment method of an IAB node.

Referring to FIG. 23, the IAB node may transmit a backhaul UL subframe that is a UL signal including reference signals to the parent node. Then, the parent node may receive a backhaul UL subframe that is a UL signal including reference signals from the IAB node (S2301). As an example, the IAB node may transmit the backhaul UL subframe including the reference signals in the second symbol, the fifth symbol, the eighth symbol, and the eleventh symbol to the parent node.

Then, the parent node may receive a backhaul UL subframe including the reference signals in the second symbol, the fifth symbol, the eighth symbol, and the eleventh symbol from the IAB node. In this case, the child node may transmit a backhaul UL subframe that is a UL signal including reference signals to the IAB node. Accordingly, the IAB node may receive a backhaul UL subframe that is a UL signal including reference signals from the child node (S2302). In this case, as an example, the child node may transmit a backhaul UL subframe including reference signals in the third symbol, the sixth symbol, the ninth symbol, and the twelfth symbol to the IAB node.

Accordingly, the IAB node may receive a backhaul UL subframe including reference signals in the third symbol, the sixth symbol, the ninth symbol, and the twelfth symbol from the child node. On the other hand, the IAB node may calculate an interval between each of the reference signals included in the backhaul UL subframe transmitted to the parent node and each of the reference signals included in the backhaul UL subframe received from the child node as the number of symbols between the starting times of the reference signals.

In this case, the IAB node may ignore a case when the interval between any one reference signal carried in the backhaul UL subframe transmitted to the parent node and the nearest reference signal carried in the backhaul UL subframe received from the child node is 3 or more, and may calculate an interval between the next reference signal and the nearest reference signal carried in the backhaul UL subframe received from the child node as the number of symbols between the starting times of the reference signals.

Looking at this process with reference to FIG. 22, the IAB node may count the number of symbols between the reference signal R11 of the second symbol carried in the backhaul UL subframe 2020b transmitted to the parent node and the reference signal R21 of the third symbol, that is the nearest reference signal carried in the backhaul UL subframe 2020a received from the child node. In this case, the value counted by the IAB node may be 4, and it may be ignored because it is greater than or equal to 3.

Then, the IAB node may count the number of symbols between the reference signal R12 of the fifth symbol carried in the backhaul UL subframe 2020b transmitted to the parent node and the reference signal R22 of the third symbol, that is the nearest reference signal carried in the backhaul UL subframe 2020a received from the child node, and the counted value may be 1. In addition, the IAB node may count the number of symbols between the starting times of the reference signal R13 of the eighth symbol carried in the backhaul UL subframe 2020b transmitted to the parent node and the reference signal R23 of the sixth symbol that is the nearest reference signal carried in the backhaul UL subframe 2020a received the child node, and the counted value may be 1.

In addition, the IAB node may count the number of symbols between the starting times of the reference signal R14 of the eleventh symbol carried in the backhaul UL subframe 2020b transmitted to the parent node and the reference signal R24 of the ninth symbol that is the nearest reference signal carried in the backhaul UL subframe 2020a received the child node, and the counted value may be 1.

Referring again to FIG. 23, the IAB node may determine an offset based on 1, which is the most repeated counted value among the counted values calculated through the above-described process (S2303). Here, the offset may be 2 obtained by subtracting 1 from the original offset 3 of the backhaul UL subframe 2020b.

In addition, the IAB node may transmit a symbol movement indication message including the offset and indicating symbol movement to the child node (S2304). Then, the child node may receive the symbol movement indication message including the offset from the IAB node. Accordingly, the child node may move reference signals in a backhaul UL subframe to be transmitted to the IAB node to satisfy the offset included in the symbol movement indication message received from the IAB node (S2305). In addition, the child node may transmit, to the IAB node, the backhaul UL subframe in which the reference signals are shifted to satisfy the offset included in the symbol movement indication message received from the IAB node (S2306).

Figure 24:
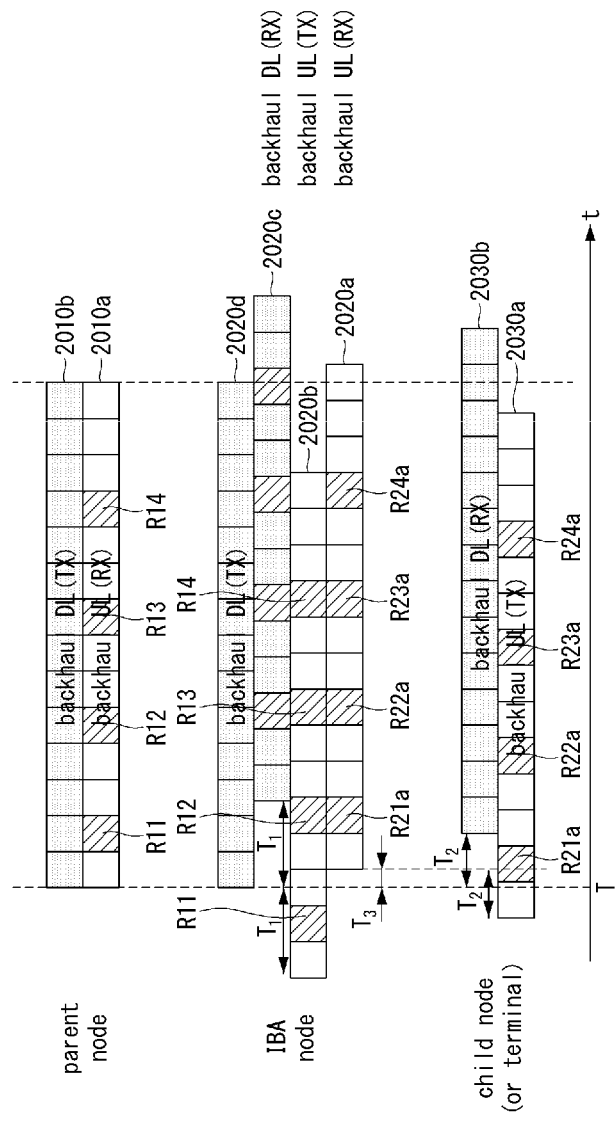
FIG. 24 is a conceptual diagram illustrating a first exemplary embodiment of a reference signal timing alignment method of an IAB node.

FIG. 24 is a conceptual diagram illustrating a first exemplary embodiment of a reference signal timing alignment method of an IAB node.

Referring to FIG. 24, the IAB node may transmit a backhaul UL subframe that is a UL signal including reference signals to the parent node. Then, the parent node may receive a backhaul UL subframe that is a UL signal including reference signals from the IAB node. As an example, the IAB node may transmit a backhaul UL subframe including reference signals R11 to R14 in the second symbol, the fifth symbol, the eighth symbol, and the eleventh symbol to the parent node.

Then, the parent node may receive a backhaul UL subframe including reference signals R11 to R14 in the second symbol, the fifth symbol, the eighth symbol, and the eleventh symbol from the IAB node. In this case, the child node may transmit a backhaul UL subframe to the IAB node, in which reference signals are shifted to satisfy the offset included in the symbol movement indication message received from the IAB node.

That is, the child node may generate a backhaul UL subframe 2030a including reference signals R21a to R24a, and transmit the backhaul UL subframe 2030a to the IAB node. In the backhaul UL subframe 2030a, the reference signal R21 previously located in the third symbol is moved to the second symbol, the reference signal R22 previously located in the sixth symbol is moved to the fifth symbol, the reference signal R23 previously located in the ninth symbol is moved to the eighth symbol, and the reference signal R24 previously located in the twelfth symbol is moved to the eleventh symbol.

Then, the IAB node may receive a backhaul uplink subframe 2020a having the reference signals R21a to R24a in the second symbol, the fifth symbol, the eighth symbol, and the eleventh symbol from the child node. Accordingly, some (e.g., R12 to R14) among the reference signals Ru to R14 carried in the backhaul UL subframe 2020b transmitted by the IAB node to the parent node may be aligned with some (e.g., R21a to R23a) among the reference signals R21a to R24a carried in the backhaul UL subframes received from the child node.

However, even when the child node moves the reference signals to satisfy the offset included in the symbol movement indication message received from the IAB node, some of the reference signals may not be aligned. That is, with respect to the reference signal in the second symbol of the backhaul UL subframe transmitted by the IAB node to the parent node, there may not be a corresponding reference signal in the backhaul UL subframe received by the IAB node from the child node.

In addition, with respect to the reference signal in the eleventh symbol of the backhaul UL subframe received by the IAB node from the child node, there may not be a corresponding reference signal in the backhaul UL subframe transmitted by the IAB node to the parent node. In order to resolve such the inconsistency problem, the IAB node may move the symbols of the backhaul UL subframe transmitted to the parent node.

Figure 25:
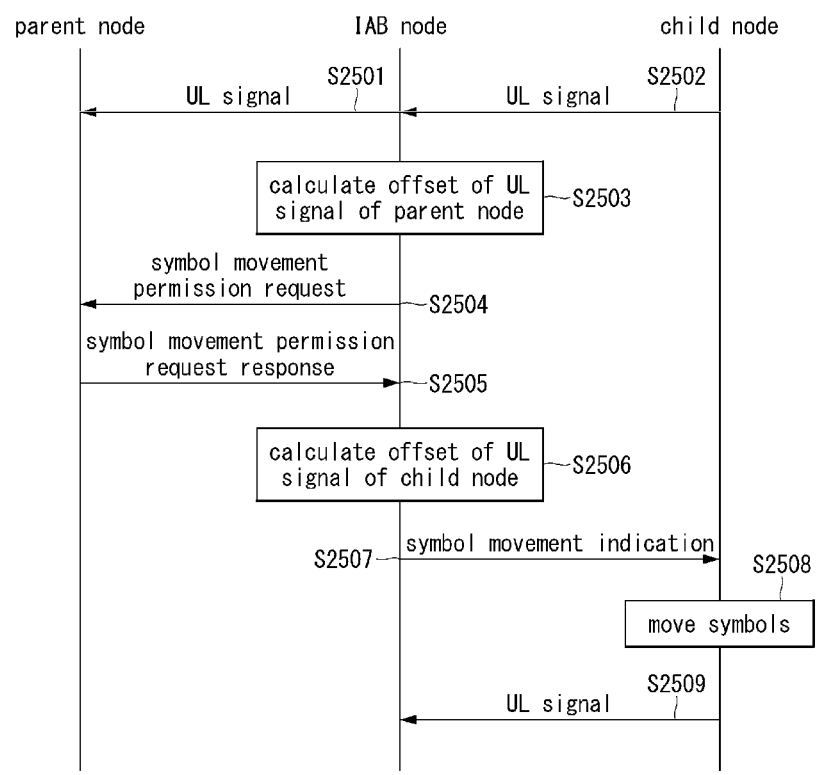
FIG. 25 is a sequence chart illustrating a second exemplary embodiment of a reference signal timing alignment method of an IAB node.

FIG. 25 is a sequence chart illustrating a second exemplary embodiment of a reference signal timing alignment method of an IAB node.

Referring to FIG. 25, the IAB node may transmit a backhaul UL subframe that is a UL signal including reference signals to the parent node. Then, the parent node may receive a backhaul UL subframe that is a UL signal including reference signals from the IAB node (S2501). As an example, the IAB node may transmit a backhaul UL subframe including the reference signals in the second symbol, the fifth symbol, the eighth symbol, and the eleventh symbol to the parent node.

Then, the parent node may receive a backhaul UL subframe including the reference signals in the second symbol, the fifth symbol, the eighth symbol, and the eleventh symbol from the IAB node. In this case, the child node may transmit a backhaul UL subframe that is a UL signal including reference signals to the IAB node. Accordingly, the IAB node may receive the backhaul UL subframe that is a UL signal including reference signals from the child node (S2502).

In this case, as an example, the child node may transmit a backhaul UL subframe including reference signals in the third symbol, the sixth symbol, the ninth symbol, and the twelfth symbol to the IAB node. Accordingly, the IAB node may receive the backhaul UL subframe including reference signals in the third symbol, the sixth symbol, the ninth symbol, and the twelfth symbol from the child node.

Meanwhile, the IAB node may calculate an offset for moving reference signals carried in a backhaul UL subframe to be transmitted to the parent node (S2503). As an example, the IAB node may calculate an offset by which the first reference signal among reference signals carried in a backhaul UL subframe to be transmitted to the parent node is moved to the first symbol of a backhaul UL subframe to be received from the child node.

Thereafter, the IAB node may transmit a symbol movement permission request message including the offset to the parent node in order to determine whether the reference signals can be moved according to the calculated offset (S2504). Accordingly, the parent node may receive the symbol movement permission request message including the offset from the IAB node. In addition, when the symbol movement is possible, the parent node may transmit a symbol movement permission request response message to the IAB node to inform that the symbol movement is possible (S2505).

Then, the IAB node may receive the symbol movement permission request response message from the parent node. Accordingly, the IAB node may generate a backhaul UL subframe in which reference signals are moved according to the calculated offset as shown in FIG. 26.

Figure 26:
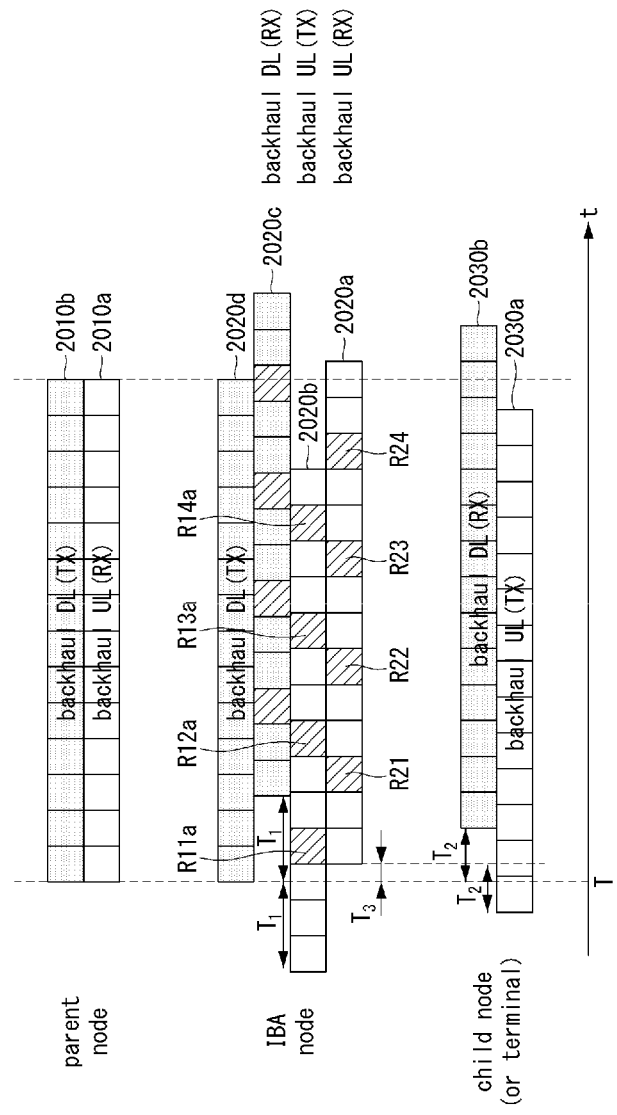
FIG. 26 is a conceptual diagram in which an IAB node moves reference signals of a UL signal to be transmitted to a parent node.

FIG. 26 is a conceptual diagram in which an IAB node moves reference signals of a UL signal to be transmitted to a parent node.

Referring to FIG. 26, the IAB node may move the first reference signal R11a among the reference signals carried in the backhaul UL subframe 2020b transmitted to the parent node, so that it is located in the first symbol of the backhaul UL subframe 2020a received from the child node. In addition, the IAB node may equally move the remaining reference signals R12a to R14a carried in the backhaul UL subframe 2020b transmitted to the parent node. The IAB node may calculate an interval between each of the reference signals included in the backhaul UL subframe 2020b transmitted to the parent node and each of the reference signals included in the backhaul UL subframe received from the child node as the number of symbols between the starting times of the reference signals. For example, the IAB node may count the number of symbols between the reference signal R11a of the fourth symbol carried in the backhaul UL subframe 2020b transmitted to the parent node and the reference signal R21 of the third symbol, that is the nearest reference signal carried in the backhaul UL subframe 2020a received from the child node, and the counted value may be 2.

Then, the IAB node may count the number of symbols between the reference signal R12a of the seventh symbol carried in the backhaul UL subframe 2020b transmitted to the parent node and the reference signal R22 of the sixth symbol, that is the nearest reference signal carried in the backhaul UL subframe 2020a received from the child node, and the counted value may be 2. In addition, the IAB node may count the number of symbols between the reference signal R13a of the tenth symbol carried in the backhaul UL subframe 2020b transmitted to the parent node and the reference signal R23 of the ninth symbol, that is the nearest reference signal carried in the backhaul UL subframe 2020a received from the child node, and the counted value may be 2.

In addition, the IAB node may count the number of symbols between the reference signal R14a of the thirteenth symbol carried in the backhaul UL subframe 2020b transmitted to the parent node and the reference signal R24 of the twelfth symbol, that is the nearest reference signal carried in the backhaul UL subframe 2020a received from the child node, and the counted value may be 2.

Referring again to FIG. 25, the IAB node may determine an offset based on 2, which is the most repeated counted value among the counted values calculated through the above-described process (S2506). Here, the IAB node may determine the offset to be 0. In addition, the IAB node may transmit a symbol movement indication message including the offset and indicating symbol movement to the child node (S2507). Then, the child node may receive the symbol movement indication message including the offset from the IAB node.

Accordingly, the child node may move reference signals in a backhaul UL subframe to be transmitted to the IAB node to satisfy the offset included in the symbol movement indication message received from the IAB node (S2508). In addition, the child node may transmit, to the IAB node, the backhaul UL subframe in which the reference signals are shifted to satisfy the offset included in the symbol movement indication message received from the IAB node (S2506).

Figure 27:
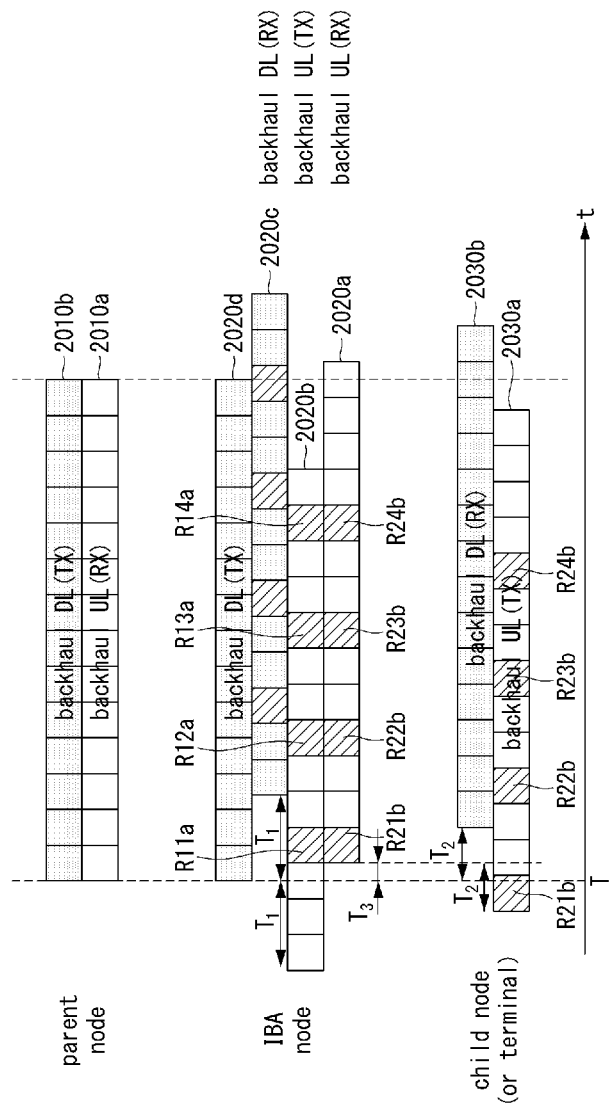
FIG. 27 is a conceptual diagram illustrating a second exemplary embodiment of a reference signal timing alignment method of an IAB node.

FIG. 27 is a conceptual diagram illustrating a second exemplary embodiment of a reference signal timing alignment method of an IAB node.

Referring to FIG. 27, the IAB node may calculates an offset by which the first reference signal among reference signals carried in a backhaul UL subframe to be transmitted to the parent node is moved to the first symbol of a backhaul UL subframe to be received from the child node. Thereafter, the IAB node may transmit a symbol movement permission request message including the offset to the parent node in order to determine whether the reference signal can be moved according to the calculated offset, and receive a symbol movement permission request response message from the parent node.

Accordingly, the IAB node may generate the backhaul uplink subframe 2020b to be transmitted to the parent node in which the reference signals are moved according to the calculated offset. In addition, The IAB node may calculate an interval between each of the reference signals included in the backhaul UL subframe transmitted to the parent node and each of the nearest reference signals included in the backhaul UL subframe received from the child node as the number of symbols between the starting times of the reference signals. The IAB node may determine an offset based on the most repeated counted value among the counted values calculated through the above-described process, and determine the offset to be 0.

In addition, the IAB node may transmit a symbol movement indication message including the offset and indicating symbol movement to the child node. Then, the child node may receive the symbol movement indication message including the offset from the IAB node. Accordingly, the child node may move reference signals in a backhaul UL subframe to be transmitted to the IAB node to satisfy the offset included in the symbol movement indication message received from the IAB node. In addition, the child node may generate the backhaul uplink subframe 2030a in which the reference signals are shifted to satisfy the offset 0 in the symbol movement indication message received from the IAB node.

Then, the child node may transmit, to the IAB node, the backhaul UL subframe 2030a in which the reference signals are shifted to satisfy the offset included in the symbol movement indication message received from the IAB node. The IAB node may receive the backhaul UL subframe 2020a in which the child node shifts the reference signals to satisfy the offset included in the symbol movement indication message received from the IAB node. In the above-described situation, the reference signals R11a to R14a carried in the backhaul uplink subframe 2020b transmitted by the IAB node to the parent node may be aligned with the reference signals R21b to R24b carried in the backhaul UL subframe 2020a received from the child node in the time domain.

On the other hand, when the IAB node can receive a signal from the parent node and receive a signal from the child node, the signal received from the parent node may interfere with the signal received from the child node. Accordingly, the IAB node may configure reference signals of a DL reception signal of a MT of the IAB node and reference signals of a UL reception signal of a DU of the IAB node to have the same pattern in the time and frequency axes.

Figure 28:
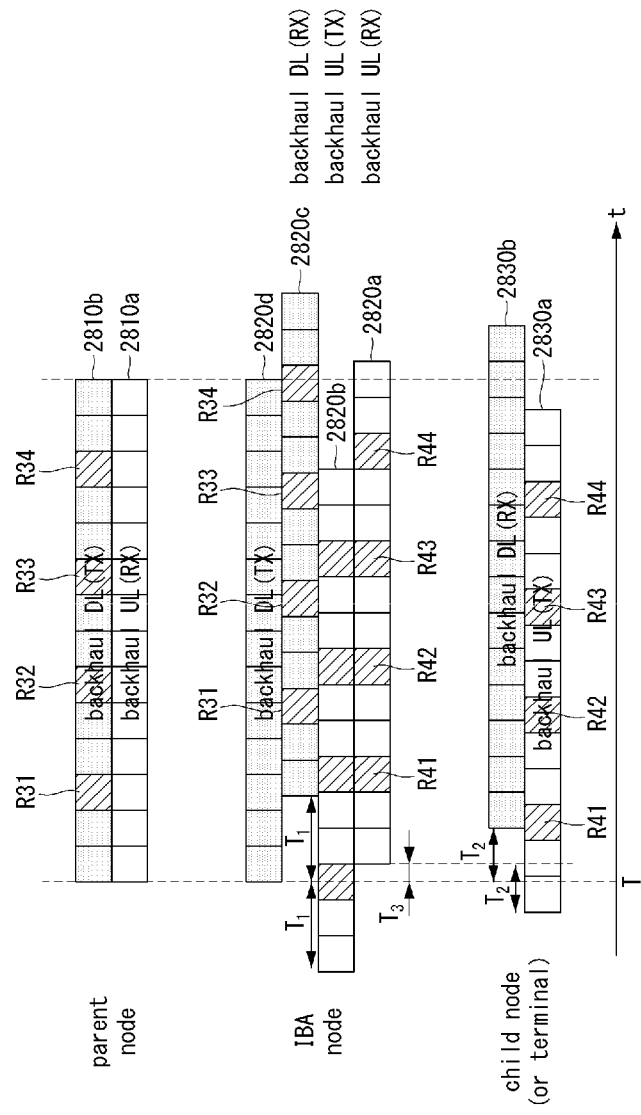
FIG. 28 is a conceptual diagram illustrating a second exemplary embodiment of a reference signal timing alignment method of an IAB node.

FIG. 28 is a conceptual diagram illustrating a second exemplary embodiment of a reference signal timing alignment method of an IAB node.

Referring to FIG. 28, the parent node may transmit a backhaul DL subframe 2810b including reference signals R31 to R34 in the third symbol, the sixth symbol, the ninth symbol, and the twelfth symbol to the IAB node. Then, the IAB node may receive a backhaul DL subframe 2820c including reference signals R31 to R34 in the third symbol, the sixth symbol, the ninth symbol, and the twelfth symbol from the parent node.

In this case, the child node may transmit a backhaul UL subframe 2830a that is a UL signal including reference signals to the IAB node. Accordingly, the IAB node may receive a backhaul UL subframe 2820a that is a UL signal including reference signals from the child node. In this case, as an example, the child node may transmit a backhaul UL subframe including reference signals R41 to R44 in the third symbol, the sixth symbol, the ninth symbol, and the twelfth symbol to the IAB node.

Accordingly, the IAB node may receive a backhaul UL subframe including reference signals R41 to R44 in the third symbol, the sixth symbol, the ninth symbol, and the twelfth symbol from the child node. In the above-described situation, the reference signals R31 to R34 carried in the backhaul DL subframe 2820c received by the IAB node from the parent node may not be aligned with the reference signals R41 to R44 carried in the backhaul UL subframe 2820a received from the child node.

In order to solve the above-described problem, the parent node may maintain configuration of the reference signals R31 to R34 carried in the backhaul UL subframe 2810a transmitted to the IAB node, and may shift the reference signals R41 to R44 carried in the backhaul UL subframe 2820a received from the child node.

Figure 29:
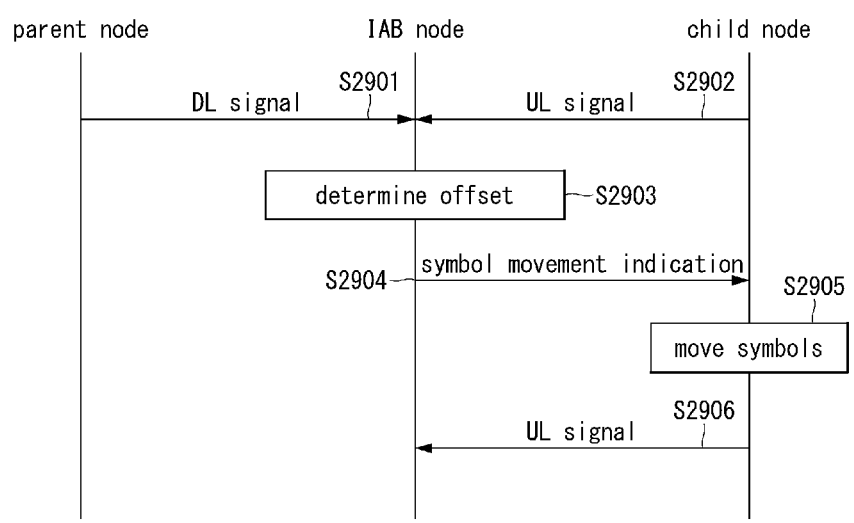
FIG. 29 is a sequence chart illustrating a third exemplary embodiment of a reference signal alignment method of an IAB node.

FIG. 29 is a sequence chart illustrating a third exemplary embodiment of a reference signal alignment method of an IAB node.

Referring to FIG. 29, the parent node may transmit, to the IAB node, a backhaul DL subframe which is a DL signal including reference signals. Then, the IAB node may receive a backhaul DL subframe that is a DL signal including reference signals from the parent node (S2901). For example, the parent node may transmit a backhaul DL subframe including reference signals in the third symbol, the sixth symbol, the ninth symbol, and the twelfth symbol to the child node. Then, the IAB node may receive a backhaul DL subframe including reference signals in the third symbol, the sixth symbol, the ninth symbol, and the twelfth symbol from the parent node.

In this case, the child node may transmit, to the IAB node, a backhaul UL subframe that is a UL signal including reference signals. Accordingly, the IAB node may receive a backhaul UL subframe that is a UL signal including reference signals from the child node (S2902). In this case, as an example, the child node may transmit a backhaul UL subframe including reference signals in the third symbol, the sixth symbol, the ninth symbol, and the twelfth symbol to the IAB node. Accordingly, the IAB node may receive a backhaul UL subframe including reference signals in the third symbol, the sixth symbol, the ninth symbol, and the twelfth symbol from the child node.

On the other hand, the IAB node may calculate an interval between each of the reference signals included in the backhaul UL subframe 2020b transmitted to the parent node and each of the nearest reference signals included in the backhaul UL subframe received from the child node as the number of symbols between the starting times of the reference signals.

In this case, the IAB node may ignore a case when the interval between any one reference signal carried in the backhaul DL subframe received from the parent node and the nearest reference signal carried in the backhaul UL subframe received from the child node is 3 or more, and may calculate an interval between the next reference signal and the nearest reference signal carried in the backhaul UL subframe received from the child node as the number of symbols between the starting times of the reference signals.

Looking at this process with reference to FIG. 28, the IAB node may count the number of symbols between the reference signal R31 of the third symbol carried in the backhaul DL subframe 2080c received from the parent node and the reference signal R41 of the third symbol, that is the nearest reference signal carried in the backhaul UL subframe 2820a received from the child node.

In this case, the value counted by the IAB node may be 1. Then, the IAB node may count the number of symbols between the reference signal R32 of the sixth symbol carried in the backhaul DL subframe 2820c received from the parent node and the reference signal R42 of the sixth symbol, that is the nearest reference signal carried in the backhaul UL subframe 2820a received from the child node, and the counted value may be 1.

In addition, the IAB node may count the number of symbols between the reference signal R33 of the ninth symbol carried in the backhaul DL subframe 2820c received from the parent node and the reference signal R43 of the ninth symbol, that is the nearest reference signal carried in the backhaul UL subframe 2820a received from the child node, and the counted value may be 1.

In addition, the IAB node may count the number of symbols between the reference signal R34 of the twelfth symbol carried in the backhaul DL subframe 2820c received from the parent node and the reference signal R44 of the twelfth symbol, that is the nearest reference signal carried in the backhaul UL subframe 2820a received from the child node, and the counted value may be 1.

Referring again to FIG. 29, the IAB node may determine an offset based the most repeated counted value among the counted values calculated through the above-described process (S2903). In addition, the IAB node may transmit a symbol movement indication message including the offset and indicating symbol movement to the child node (S2904).

Then, the child node may receive the symbol movement indication message including the offset from the IAB node. Accordingly, the child node may move reference signals in a backhaul UL subframe to be transmitted to the IAB node to satisfy the offset included in the symbol movement indication message received from the IAB node (S2905). In addition, the child node may transmit, to the IAB node, the backhaul UL subframe in which the reference signals are shifted to satisfy the offset included in the symbol movement indication message received from the IAB node (S2906).

Figure 30:
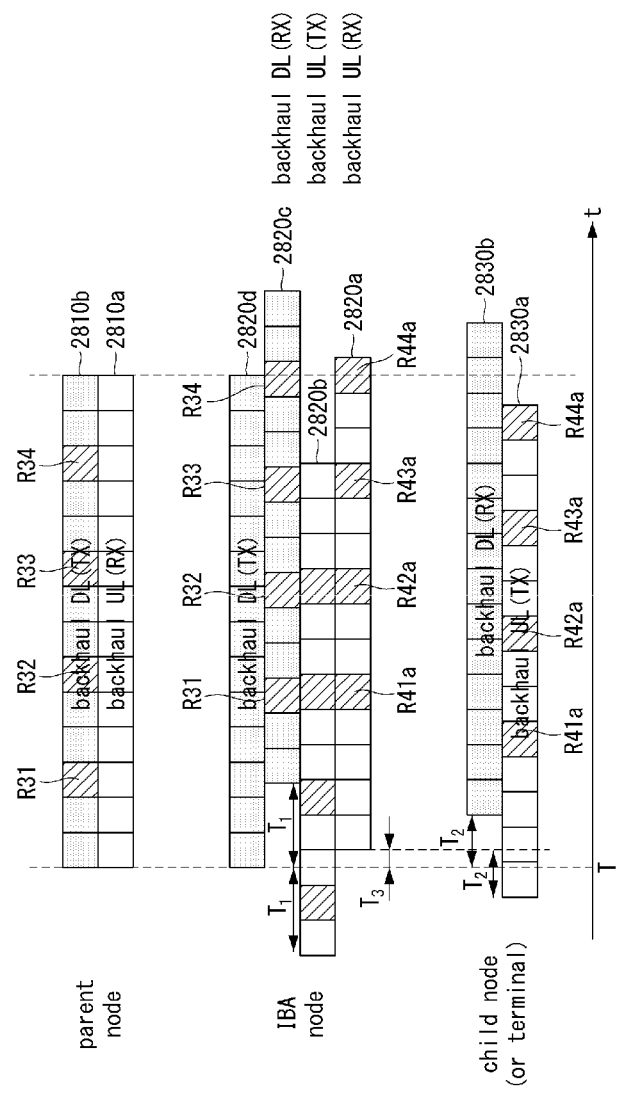
FIG. 30 is a conceptual diagram illustrating a third exemplary embodiment of a reference signal timing alignment method of an IAB node.

FIG. 30 is a conceptual diagram illustrating a third exemplary embodiment of a reference signal timing alignment method of an IAB node.

Referring to FIG. 30, the parent node may transmit a backhaul DL subframe 2801b that is a DL signal including reference signals to the IAB node. Then, the IAB node may receive a backhaul DL subframe 2820c that is a DL signal including reference signals from the parent node. As an example, the parent node may transmit a backhaul DL subframe including reference signals R31 to R34 in the third symbol, the sixth symbol, the ninth symbol, and the twelfth symbol to the IAB node.

Then, the IAB node may receive a backhaul DL subframe including reference signals R31 to R34 in the third symbol, the sixth symbol, the ninth symbol, and the twelfth symbol from the parent node. In this case, the child node may transmit, to the IAB node, a backhaul UL subframe 2830a that satisfies the offset included the symbol movement indication message received from the IAB node.

That is, the child node may generate the backhaul UL subframe 2830a in which the reference signal previously located in the third symbol is moved to the fifth symbol, the reference signal previously located in the sixth symbol is moved to the eighth symbol, the reference signal previously located in the ninth symbol is moved to the eleventh symbol, and the reference signal previously located in the twelfth symbol is moved to the fourteenth symbol, and transmit the backhaul UL subframe 2830a.

Then, the IAB node may receive a backhaul UL subframe 2820a having the reference signals R41a to R44a in the fifth symbol, the eighth symbol, the eleventh symbol, and the fourteenth symbol from the child node. In this case, the reference signals R31 to R34 carried in the backhaul DL subframe 2820c received by the IAB node from the parent node may be aligned with the reference signals R41a to R44a carried in the backhaul UL subframe 2820a received from the child node.

On the other hand, the reference signals in the backhaul UL subframe 2820a received by the IAB node from the child node are biased too far to the right as shown in FIG. 30, resulting in performance degradation. Accordingly, the IAB node may request the parent node to shift the reference signals to the left in the time domain. When the IAB node receives a permission response to such the request through downlink control information, the IAB node may shift the reference signals of the child node by one symbol from a timing negotiated with the parent node so that the two reference signals are aligned with each other.

Figure 31:
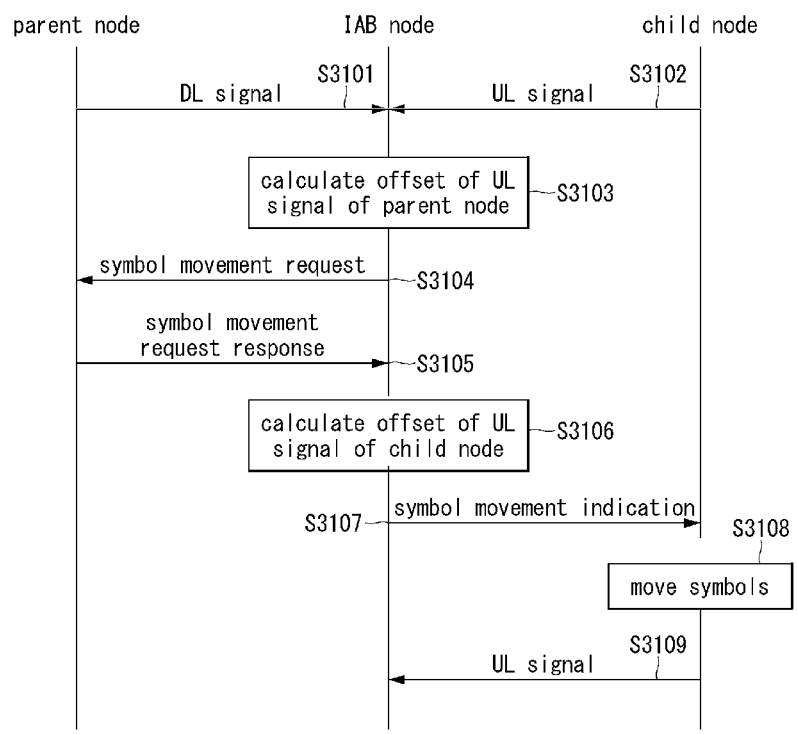
FIG. 31 is a sequence chart illustrating a fourth exemplary embodiment of a reference signal alignment method of an IAB node.

FIG. 31 is a sequence chart illustrating a fourth exemplary embodiment of a reference signal alignment method of an IAB node.

Referring to FIG. 31, the parent node may transmit, to the IAB node, a backhaul DL subframe which is a DL signal including reference signals. Then, the IAB node may receive a backhaul DL subframe that is a DL signal including reference signals from the parent node (S3101). For example, the parent node may transmit a backhaul DL subframe including reference signals in the third symbol, the sixth symbol, the ninth symbol, and the twelfth symbol to the IAB node. Then, the IAB node may receive a backhaul DL subframe including reference signals in the third symbol, the sixth symbol, the ninth symbol, and the twelfth symbol from the parent node. In this case, the child node may transmit a backhaul UL subframe that is a UL signal including reference signals to the IAB node.

Accordingly, the IAB node may receive a backhaul UL subframe that is a UL signal including reference signals from the child node (S3102). In this case, as an example, the child node may transmit a backhaul UL subframe including reference signals in the third symbol, the sixth symbol, the ninth symbol, and the twelfth symbol to the IAB node. Accordingly, the IAB node may receive a backhaul UL subframe including reference signals in the third symbol, the sixth symbol, the ninth symbol, and the twelfth symbol from the child node.

On the other hand, the IAB node may calculate an offset for moving the reference signals carried in a backhaul DL subframe to be received from the parent node (S3103). As an example, the IAB node may calculate an offset by which the first reference signal among reference signals carried in a backhaul DL subframe to be received from the parent node moves closer to the first reference signal of a backhaul UL subframe to be received from the child node. As an example, the offset may be determined to be 2.

Thereafter, the IAB node may transmit a symbol movement request message including the offset to the parent node in order to determine whether the reference signal can be moved according to the calculated offset (S3104). Accordingly, the parent node may receive the symbol movement request message including the offset from the IAB node. In addition, when the symbol movement is possible, the parent node may transmit a symbol movement request response message to the IAB node to inform that the symbol movement is possible (S3105). Then, the IAB node may receive the symbol movement request response message from the parent node. Thereafter, the parent node may transmit a backhaul DL subframe in which reference signals are moved according to the offset to the IAB node. Accordingly, the IAB node may receive a backhaul DL subframe in which reference signals are moved according to the offset as shown in FIG. 32 from the parent node.

Figure 32:
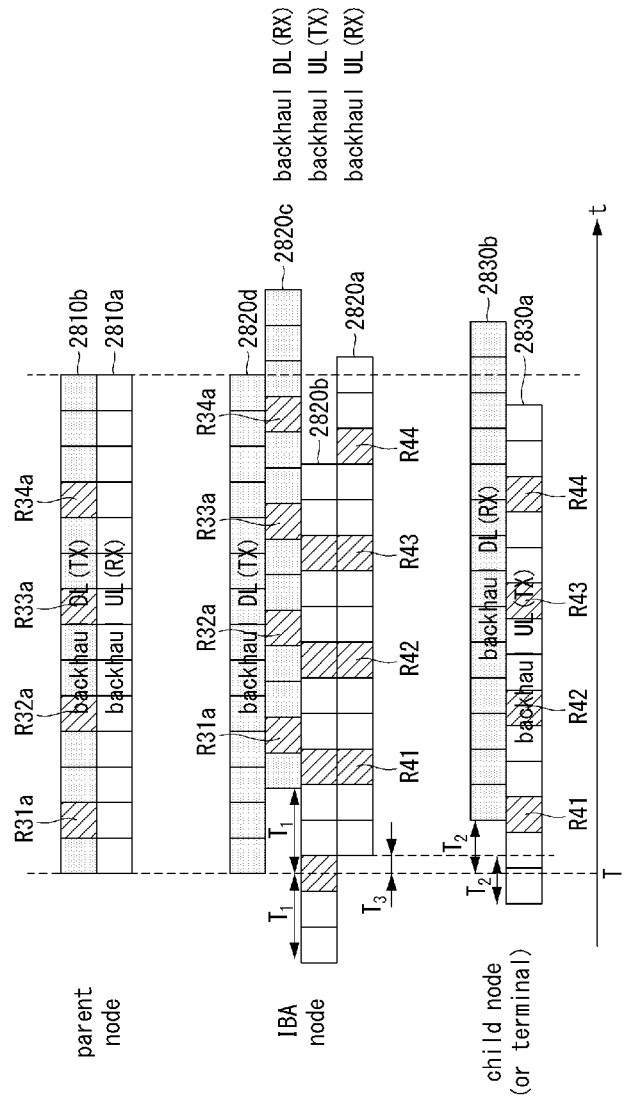
FIG. 32 is a conceptual diagram illustrating a case where an IAB node receives a DL signal in which reference signals are moved from a parent node.

FIG. 32 is a conceptual diagram illustrating a case where an IAB node receives a DL signal in which reference signals are moved from a parent node.

Referring to FIG. 32, the parent node may move the first reference signal R31 among reference signals carried in a backhaul DL subframe 2820c to be transmitted to the IAB node to be close to the first reference signal R41 of a backhaul UL subframe to be received from the child node. In addition, the parent node may move the remaining reference signals R32 to R34 in the same manner.

The IAB node may calculate an interval between each of the reference signals included in the backhaul UL subframe received from the parent node and each of the nearest reference signals included in the backhaul UL subframe received from the child node as the number of symbols between the starting times of the reference signals.

In this case, the IAB node may ignore a case when the interval between any one reference signal carried in the backhaul UL subframe transmitted to the parent node and the nearest reference signal carried in the backhaul UL subframe received from the child node is 3 or more, and may calculate an interval between the next reference signal and the nearest reference signal carried in the backhaul UL subframe received from the child node as the number of symbols between the starting times of the reference signals.

In this regard, the IAB node may count the number of symbols between the reference signal R31a of the second symbol carried in the backhaul DL subframe 2820c received from the parent node and the nearest reference signal R41 of the third symbol carried in the backhaul UL subframe 2820a received from the child node. In this case, the counted value may be 1. Then, the IAB node may count the number of symbols between the reference signal R32a if the fifth symbol carried in the backhaul DL subframe 2820c received from the parent node and the nearest reference signal R42 of the sixth symbol carried in the backhaul UL subframe 2820a received from the child node. In this case, the counted value may be 1.

In addition, the IAB node may count the number of symbols between the reference signal R33a of the eighth symbol carried in the backhaul DL subframe 2820c received from the parent node and the nearest reference signal R43 of the ninth symbol carried in the backhaul UL subframe 2820a received from the child node. In this case, the counted value may be 1. In addition, the IAB node may count the number of symbols between the reference signal R34a of the eleventh symbol carried in the backhaul DL subframe 2820c received from the parent node and the nearest reference signal R44 of the twelfth symbol carried in the backhaul UL subframe 2820a received from the child node. In this case, the counted value may be 1.

Referring again to FIG. 31, the IAB node may determine an offset based on the most repeated counted value among the counted values calculated through the above-described process (S3106). Here, the IAB node may determine the offset to be 4. Then, the IAB node may transmit a symbol movement indication message including the offset and indicating symbol movement to the child node (S3107).

Then, the child node may receive the symbol movement indication message including the offset from the IAB node. Accordingly, the child node may move reference signals in a backhaul UL subframe to be transmitted to the IAB node to satisfy the offset included in the symbol movement indication message received from the IAB node (S3108). Then, the child node may transmit, to the IAB node, a backhaul uplink subframe in which the reference signals are moved to satisfy the offset included in the symbol movement indication message received from the IAB node (S3109).

Figure 33:
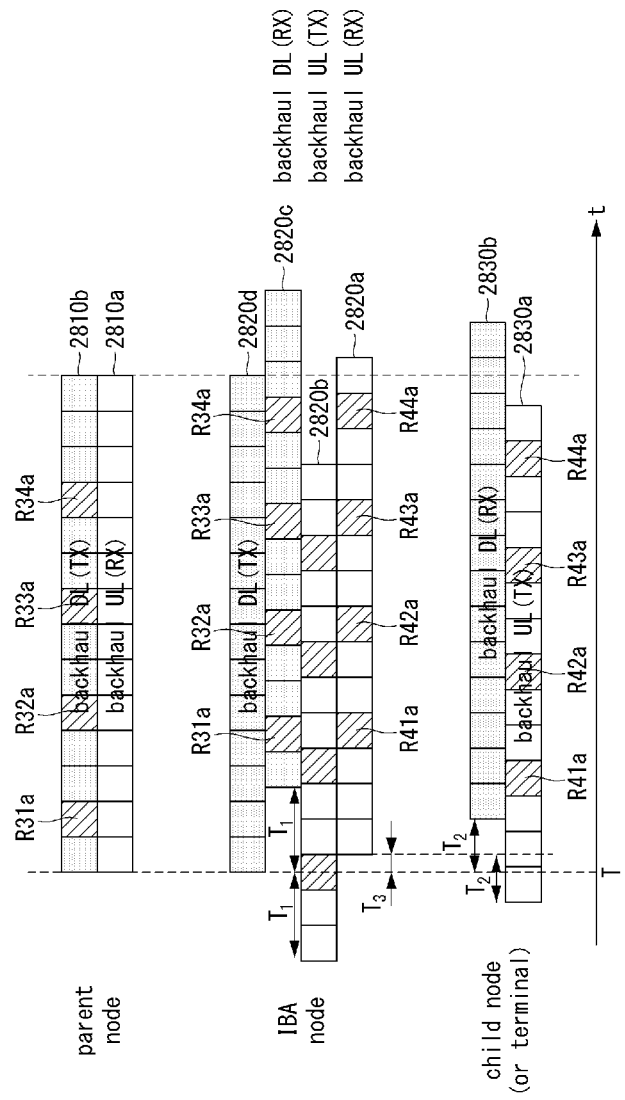
FIG. 33 is a conceptual diagram illustrating a fourth exemplary embodiment of a reference signal timing alignment method of an IAB node.

FIG. 33 is a conceptual diagram illustrating a fourth exemplary embodiment of a reference signal timing alignment method of an IAB node.

Referring to FIG. 33, the parent node may transmit a backhaul DL subframe 2801b that is a DL signal including reference signals to the IAB node. In this case, the IAB node may calculate an offset by which the first reference signal among reference signals carried in a backhaul DL subframe to be received from the parent node moves closer to the first reference signal of a backhaul uplink subframe to be received from the child node. Here, the offset may be determined to be 2.

Thereafter, the IAB node may transmit a symbol movement request message including the offset to the parent node to determine whether the reference signal can be moved according to the calculated offset. Accordingly, the parent node may receive the symbol movement request message including the offset from the IAB node. In addition, when the symbol movement is possible, the parent node may transmit a symbol movement request response message to the IAB node to inform that the symbol movement is possible.

Then, the IAB node may receive the symbol movement request response message from the parent node. Thereafter, the parent node may generate a backhaul DL subframe 2810b in which reference signals are moved according to the offset and transmit it to the IAB node. Accordingly, the IAB node may receive a backhaul downlink subframe 2820c in which the reference signals are moved according to the offset from the parent node.

On the other hand, the IAB node may calculate an interval between each of the reference signals R31a to R34a included in a backhaul UL subframe to be received from the parent node and each of the nearest reference signals included in a backhaul UL subframe to be received from the child node as the number of symbols between the starting times of the reference signals. In this case, the IAB node may ignore a case when the interval between any one reference signal carried in the backhaul UL subframe transmitted to the parent node and the nearest reference signal carried in the backhaul UL subframe received from the child node is 3 or more, and may calculate an interval between the next reference signal and the nearest reference signal carried in the backhaul UL subframe received from the child node as the number of symbols between the starting times of the reference signals. The IAB node may determine the offset based on the most repeated counted value among the calculated counted values. Here, the offset may be 4.

In addition, the IAB node may transmit a symbol movement indication message including the offset and indicating symbol movement to the child node. Then, the child node may receive the symbol movement indication message including the offset from the IAB node. Accordingly, the child node may move the reference signals in the backhaul UL subframe transmitted to the IAB node to satisfy the offset included in the symbol movement indication message received from the IAB node.

In addition, the child node may generate a backhaul UL subframe 2830a including the reference signals R41a to R44a shifted to satisfy the offset included in the symbol movement indication message received from the IAB node. Thereafter, the child node may transmit, to the IAB node, the backhaul UL subframe 2830a including the reference signals R41a to R44a shifted to satisfy the offset included the symbol movement indication message received from the IAB node.

The IAB node may receive, from the child node, the backhaul UL subframe 2820a in which the reference signals R41a to R44a are shifted to satisfy the offset included in the symbol movement indication message received from the IAB node. In the above-described situation, the reference signals R31a to R34a carried in the backhaul UL subframe 2820b transmitted by the IAB node to the parent node may be aligned with the reference signals R41a to R44a carried in the backhaul UL subframe 2820a received from the child node.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. An operation method of an integrated access and backhaul (IAB) node in a communication system, the operation method comprising:
    measuring a power difference between a first signal received from a first node and a second signal received from a second node;
    controlling a transmit power of each of the first node and the second node based on the power difference;
    generating scheduling information for allowing the first node and the second node to simultaneously transmit signals;
    transmitting the scheduling information to the first node and the second node; and
    receiving signals that the first node and the second node simultaneously transmit according to the scheduling information by using the transmit power.

2. The operation method according to claim 1, wherein the controlling of the transmit power comprises:
    determining whether the power difference exceeds a first threshold;
    in response to determining that the power difference exceeds the first threshold, identifying first headroom information of the first node and second headroom information of the second node;
    determining the transmit power of the first node based on the first headroom information and determining the transmit power of the second node based on the second headroom information; and
    transmitting information on the determined transmit powers to the first node and the second node.

3. The operation method according to claim 2, wherein the controlling of the transmit power comprises:
    determining whether the power difference exceeds a second threshold; and
    in response to determining that the power difference exceeds the second threshold, switching a transmission scheme of the first node and a transmission scheme of the second node from a non-time division multiplexing (TDM) scheme to a TDM scheme.

4. The operation method according to claim 1, wherein the controlling of the transmit power comprises:
    determining whether the power difference exceeds a first threshold;
    in response to determining that the power difference exceeds the first threshold, transmitting, to the first node, a request signal indicating a first power adjustment range and indicating an adjustment to a transmit power within the first power adjustment range; and
    receiving a response signal including information indicating that the transmit power of the first node is adjusted to a transmit power within the first power adjustment range.

5. The operation method according to claim 1, wherein the controlling of the transmit power comprises:
    determining whether the power difference exceeds a first threshold;
    in response to determining that the power difference exceeds the first threshold, transmitting, to the first node, a request signal of a second power adjustment range;
    receiving, from the first node, a response signal including the second power adjustment range;

identifying the second power adjustment range in the response signal; and selecting a transmit power within the second power adjustment range, and transmitting a request signal indicating an adjustment to the selected transmit power to the first node.

\* \* \* \* \*